United States Patent [19]
Hirokane et al.

[11] Patent Number: 5,600,627
[45] Date of Patent: Feb. 4, 1997

[54] OPTICAL DISK AND A METHOD FOR RECORDING, REPRODUCING, AND DELETING INFORMATION ON AND FROM THE OPTICAL DISK

[75] Inventors: Junji Hirokane, Nara; Hiroyuki Katayama, Sakura; Akira Takahashi, Nara; Kenji Ohta, Nara-ken, all of Japan

[73] Assignee: Sharp Kabushiki Kaisha, Osaka, Japan

[21] Appl. No.: 340,333

[22] Filed: Nov. 14, 1994

[30] Foreign Application Priority Data

Nov. 16, 1993 [JP] Japan .................................. 5-286478
Nov. 16, 1993 [JP] Japan .................................. 5-286479

[51] Int. Cl.$^6$ .................................................. G11B 13/04
[52] U.S. Cl. ........................... 369/275.4; 369/275.3; 369/275.1; 369/279
[58] Field of Search ......................... 369/275.4, 275.3, 369/275.2, 275.1, 273, 277, 279

[56] References Cited

U.S. PATENT DOCUMENTS

| | | | |
|---|---|---|---|
| 4,879,691 | 11/1989 | Suzuki | 369/275.1 |
| 4,947,384 | 8/1990 | Suzuki et al. | 369/275.1 |
| 5,179,547 | 1/1993 | Komaki et al. | 369/275.1 |
| 5,185,730 | 2/1993 | Komaki et al. | 369/275.1 |
| 5,199,022 | 3/1993 | Suzuki et al. | |
| 5,383,176 | 1/1995 | Inui et al. | 369/275.4 |

FOREIGN PATENT DOCUMENTS

| | | |
|---|---|---|
| 0559449A2 | 9/1993 | European Pat. Off. . |
| 0570235A2 | 11/1993 | European Pat. Off. . |
| 0595349A1 | 5/1994 | European Pat. Off. . |
| 4212663 | 4/1992 | Germany . |
| 4220192 | 6/1992 | Germany . |
| 3-214428 | 9/1991 | Japan . |
| 4-27610 | 5/1992 | Japan . |

OTHER PUBLICATIONS

Paper of Electronic Information Communications Society, "Development of High Speed Magneto–Optical Disk Drive Using 4 Beam Optical Head", Sep. 25, 1990, MR90 31, pp. 37–44, partial translation.

ISOM/ODS '93 Conference Digest, "Feasibility Study on High Data Transfer Rate of 300 Mbit/s with 8–beam Laser Diode Array", 1993, pp. 53–54.

*Primary Examiner*—David C. Nelms
*Assistant Examiner*—Vu A. Le
*Attorney, Agent, or Firm*—Nixon & Vanderhye, P.C.

[57] ABSTRACT

The method of the present invention is for recording, reproducing, and deleting information on and from an optical disk including a plurality of tracks each having M guide grooves (M is an integer equal to or larger than 2) and M-1 land(s) interposed between the adjacent guide grooves, at least one of the land(s) having a group of pits for producing address information. The method includes the step of: focusing light beams on the respective guide grooves and land(s) for effecting the recording, reproduction, and deletion of information. Such an optical disk is also provided.

17 Claims, 16 Drawing Sheets

A-A Section

A-A Section

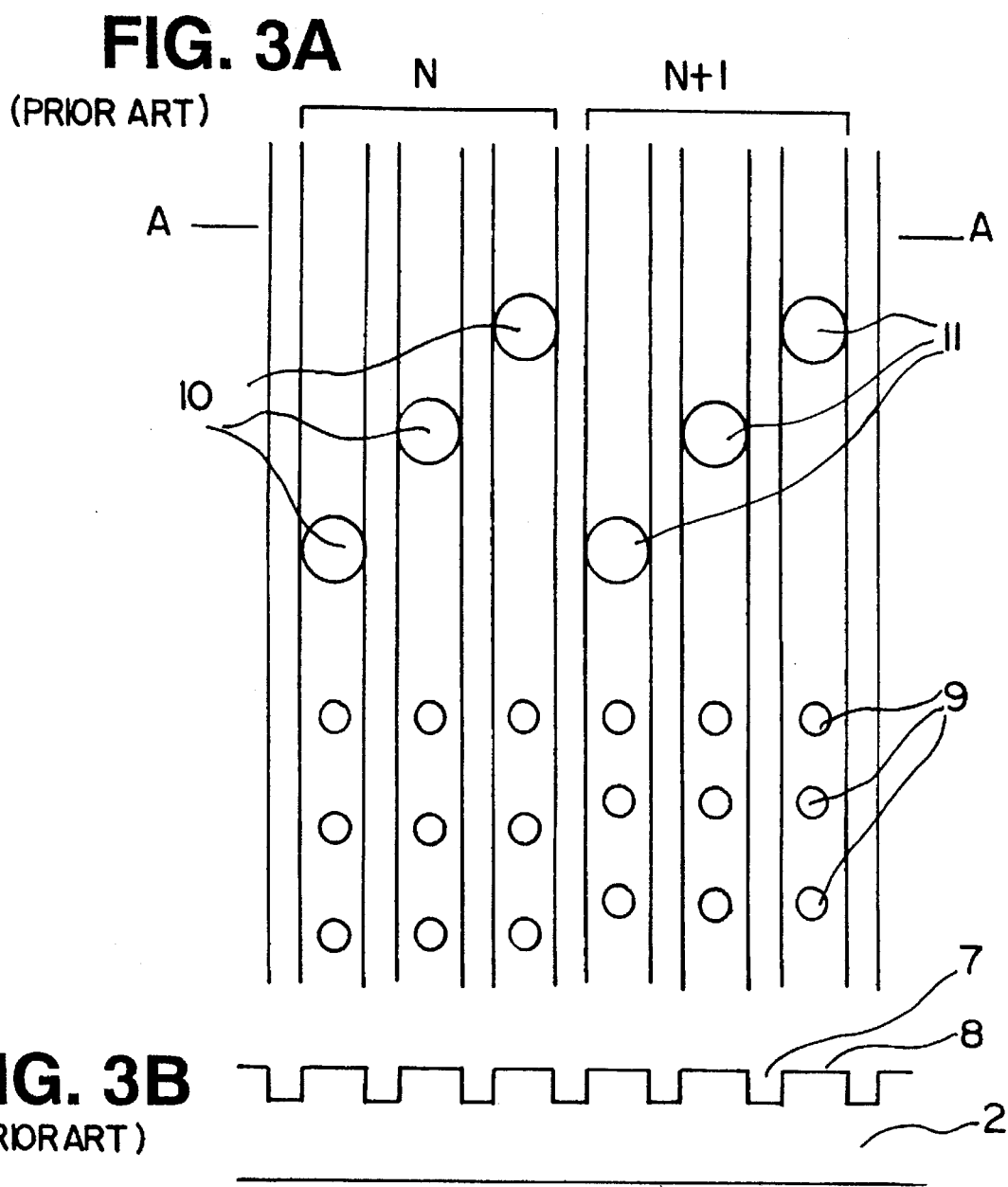

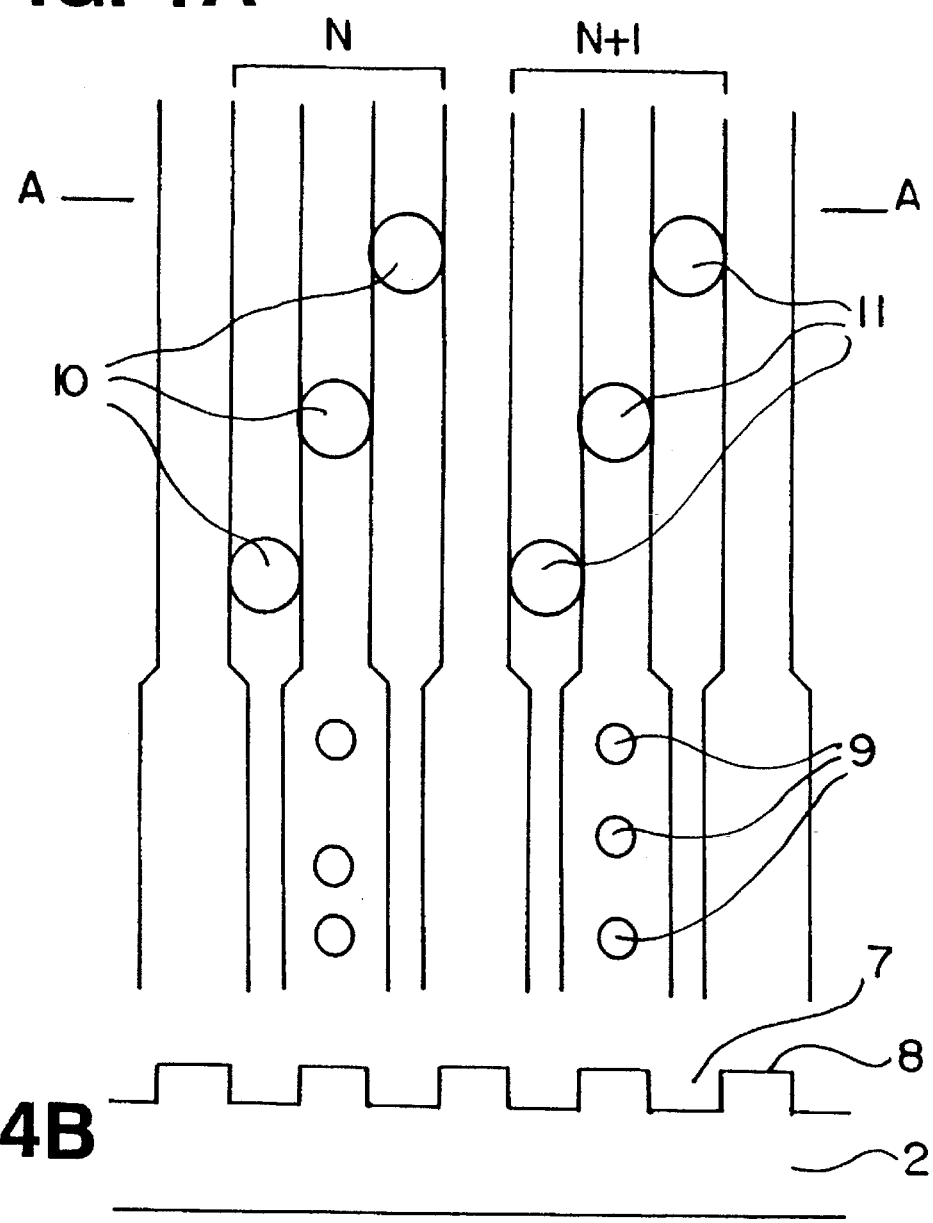

A-A Section

A—A Section

A-A Section

A—A Section

A–A Section

A-A Section

A-A Section

A-A Section

A-A Section

OPTICAL DISK AND A METHOD FOR RECORDING, REPRODUCING, AND DELETING INFORMATION ON AND FROM THE OPTICAL DISK

BACKGROUND OF THE INVENTION

1. Field of the Invention

The present invention relates to an optical disk and the like set in an optical disk unit, and a method for recording, reproducing, and deleting information on and from such an optical disk.

2. Description of the Related Art

In recent years, rewritable optical disks have been studied and developed. As a result, some rewritable optical disks have already been put into practical use as external memories for computers. Such conventional optical disks have spiral guide grooves formed thereon, and groups of groove-shaped pits are formed on spaces between the adjacent guide grooves (hereinafter, such spaces are called lands). Information is recorded on, or reproduced or deleted from the optical disk by focusing a light beam on the land between the guide grooves. Positional information indicating the position on the optical disk is produced by the arrangement of each group of pits, so that the light beam can be guided to a target position on the optical disk.

In order to increase the recording density of the optical disk, Japanese Patent Publication No. 4-27610 proposes to record information on both the guide grooves and the lands, both of which have widths that are made substantially the same. In this proposed method, however, since only one light beam is used for the guide grooves and the lands to effect the recording, reproduction, and deletion of information, the data transfer rate will not be improved compared with the preceding optical disks. Further, the above prior art does not describe how the light beam accesses a target position except for the mention of using an address signal.

In order to improve the data transfer rate, a multibeam method where information is recorded, reproduced, and deleted by using a plurality of light beams has been vigorously studied. Japanese Laid-Open Patent Publication No. 3-214428, for example, proposes to provide one unit of address information for a plurality of tracks.

FIG. 4 of "Development of High Speed Magneto-optical Disk Drive Using 4 Beam Optical Head" (Paper of Electronic Information Communications Society, Sep. 25, 1990, MR90 31, pp. 37–44) discloses the structure of an optical disk where information is recorded, reproduced, and deleted by using a plurality of light beams. According to this disclosure, a guide groove at a pitch of 6 μm and groups of pits (Preformat IDs) arranged parallel to the guide groove are formed on the optical disk. An array of four light beams are positioned inclined with regard to the guide groove. One of the four light beams moves on the guide groove irradiating the guide groove. Another light beam adjacent to the one on the guide groove reproduces information stored by the pits (hereinafter, such information is referred to as pit information).

According to the above conventional optical disk, one of the four light beams is used to record information on the guide groove while the other three are used to record information on flat lands of the optical disk. Since the thermal diffusion at the guide groove is different from that at the land, the recording power of the respective light beams is required to be individually optimized to obtain a uniform recording status. Further, when the inclination of the array of light beams with regard to the guide groove changes, each of the light beams, other than the one located on the guide groove, moves on a line deviated from the line where information has been recorded.

In order to solve the above problem, "Feasibility Study on High Data Transfer Rate of 300 Mbit/s with 8-beam Laser Diode Array" (ISOM/ODS'93 Conference Digest, pp. 53–54) discloses a method for adjusting the inclination of eight light beams with regard to guide grooves, while using a preceding optical disk, so as to precisely position the eight light beams on eight lands between the guide grooves.

In the above multibeam method disclosed in Japanese Laid-Open Patent Publication No. 3-214428, as shown in FIG. 2 thereof, groups of pits for producing address information are formed in line with guide grooves, not on lands where information is recorded, reproduced, and deleted. With this structure, each of a plurality of light beams is required to be split into three light beams so as to allocate one of the split three light beams for reading pit information produced by the pits formed in line with the guide grooves. This results in complicating the structure of an optical head. Also, since each of the plurality of light beams for recording and deleting information is split into three, the intensity of the main light beam allocated for recording and deleting information is lowered. This necessitates to use a semiconductor laser with a higher output as a light source. Moreover, since only the lands are used for the recording, reproduction, and deletion of information, the recording density is as low as that of the preceding optical disks.

SUMMARY OF THE INVENTION

The method of the present invention is for recording, reproducing, and deleting information on and from an optical disk including a plurality of tracks each having M guide grooves (M is an integer equal to or larger than 2) and M-1 land(s) interposed between the adjacent guide grooves, at least one of the land(s) having a group of pits for producing address information. The method includes the step of: focusing light beams on the respective guide grooves and land(s) for effecting the recording, reproduction, and deletion of information.

In one example, the guide grooves and the lands have substantially the same width.

In another aspect of the present invention, an optical disk is provided, which includes a plurality of tracks each including M guide grooves (M is an integer equal to or larger than 2) and M-1 land(s) interposed between the adjacent guide grooves, at least one of the land(s) having a group of pits for producing address information, wherein at least one land having no pits is interposed among the lands having the group of pits.

In one example, the guide grooves and the lands have substantially the same width.

In another example, the land having no pits which is located between the adjacent tracks has a width smaller than the lands having the group of pits which is located in the tracks.

In yet another example, an area of the lands having the group of pits where the group of pits are formed has a width greater than the other area of the lands where the group of pits are not formed.

In yet another example, the land having no pits which is located between the adjacent tracks has a width smaller than the lands having the group of pits which is located in the tracks.

In yet another aspect of the present invention, an optical disk is provided, which includes a plurality of tracks each including M guide grooves (M is an integer equal to or larger than 2) and M-1 land(s) interposed between the adjacent guide grooves, wherein a group of pits for producing address information are formed in line with at least one of the guide grooves which is located in each of the tracks.

In one example, the guide grooves and the lands have substantially the same width.

In another example, each of the tracks includes three guide grooves and two lands interposed between the adjacent guide grooves, and the group of pits for producing address information are formed in line with one of the three guide grooves which is located in the center.

In yet another example, a land which is located between the adjacent tracks has a width smaller than the land which is located in each of the tracks.

In yet another example, the diameter of the pits is smaller than the width of the guide grooves.

In yet another aspect of the present invention, an optical disk is provided, which includes a plurality of tracks each including M guide grooves (M is an integer equal to or larger than 2) and M-1 land(s) interposed between the adjacent guide grooves, wherein a group of pits for producing address information are formed on at least one of the land(s).

In one example, a group of pits for producing address information are formed in line with at least one pair of the guide grooves which are located in each of the tracks.

In another example, the diameter of the pits is smaller than the width of the guide grooves.

Thus, according to the present invention, each track of an optical disk includes M guide grooves (M is an integer equal to or larger than 2) and M-1 lands formed between the guide grooves. These guide grooves and lands have substantially the same width. The recording, reproduction, and deletion of information is conducted by using 2M-1 light beams focused on the respective guide grooves and lands. Pits are formed on one land or a plurality of lands constituting the track for producing address information. With this structure, since at least one light beam among the plurality of light beams passes over the pits, it is not necessary to split the respective light beams used for the recording, reproduction, and deletion of information into three as described in Japanese Laid-Open Patent Publication No. 3-214428. This allows the use of a semiconductor laser with a comparatively low output to achieve the recording, reproduction, and deletion of information. Also, the accessing across the track(s) can be made more precisely by using the total of the amounts of reflected light obtained from the plurality of light beams. Moreover, since all of M guide grooves and M-1 lands are used for the recording, reproduction, and deletion of information, the recording density can be improved compared with conventional optical disks.

In the optical disk with the above structure, the width of the portions of the guide grooves which are in an area where bits are collectively formed may be made smaller than that of the other portions of the guide grooves, so that pits of a larger size can be formed easily. This makes it possible to obtain a greater variation in the amount of reflected light from a light beam when it passes over the pits. As a result, more precise positional information can be obtained from the pits.

In another aspect of the present invention, each track of an optical disk includes M guide grooves (M is an integer equal to or larger than 2) and M-1 lands formed between the guide grooves. These guide grooves and lands have substantially the same width. The recording, reproduction, and deletion of information is conducted by using 2M-light beams focused on the respective guide grooves and lands. Pits are formed in line with one guide groove or a plurality of guide grooves constituting the track for producing address information. With this structure, since at least one light beam among the plurality of light beams passes over the pits, it is not necessary to split the respective light beams used for the recording, reproduction, and deletion of information into three as described in Japanese Laid-Open Patent Publication No. 3-214428. This allows the use of a semiconductor laser with a comparatively low output to achieve the recording, reproduction, and deletion of information. Also, the accessing across the track(s) can be made more precisely by using the total of the amounts of reflected light from the plurality of light beams. Moreover, since all of M guide grooves and M-1 lands are used for the recording, reproduction, and deletion of information, the recording density can be improved compared with conventional optical disks.

In the optical disk with the above structure, the diameter of the pits may be made smaller than the width of the guide grooves, so that a greater variation in the amount of reflected light from a light beam when it passes over the pits can be obtained. As a result, more precise positional information can be obtained from the pits.

In the above optical disks according to the present invention, the width of the lands separating the tracks may be made smaller than that of the lands constituting the tracks. This makes it possible to improve the recording density of the optical disks.

According to the present invention, the portion of the pits used for producing address information is formed continuously with the portion of the land used for the recording, reproduction, and deletion of information. Accordingly, the pit information on the land can be read without splitting a plurality of light beams. This not only simplifies an optical head, but also makes it possible to use a semiconductor laser with a lower output as a light source because the intensity of a main light beam for the recording and deletion of information is not lowered.

Further, according to the present invention, at least one light beam crosses a guide groove or a land having no pits. Accordingly, the number of guide grooves crossed by the light beams can be correctly counted by using a signal obtained from the light beam which has crossed the guide groove or the land having no pits. As a result, higher-speed and more precise accessing is possible.

Thus, the invention described herein makes possible the advantages of (1) providing a method for recording, reproducing, and deleting information on and from an optical disk using a plurality of light beams, where both guide grooves and lands thereof are used for the recording, reproduction, and deletion of information, so as to improve the recording density of the optical disk, and a method for producing positional information by arranging groups of pits on the optical disk so as to allow the positional information to be reproduced and also precise accessing to a target position with high speed to be achieved, and (2) providing such an optical disk.

These and other advantages of the present invention will become apparent to those skilled in the art upon reading and understanding the following detailed description with reference to the accompanying figures.

BRIEF DESCRIPTION OF THE DRAWINGS

FIGS. 3A and 3B are a plan view and a sectional view, respectively, of a conventional optical disk.

FIGS. 4A and 4B are a plan view and a sectional view, respectively, of another optical disk according to the present invention.

DESCRIPTION OF THE PREFERRED EMBODIMENTS

Figure 1:
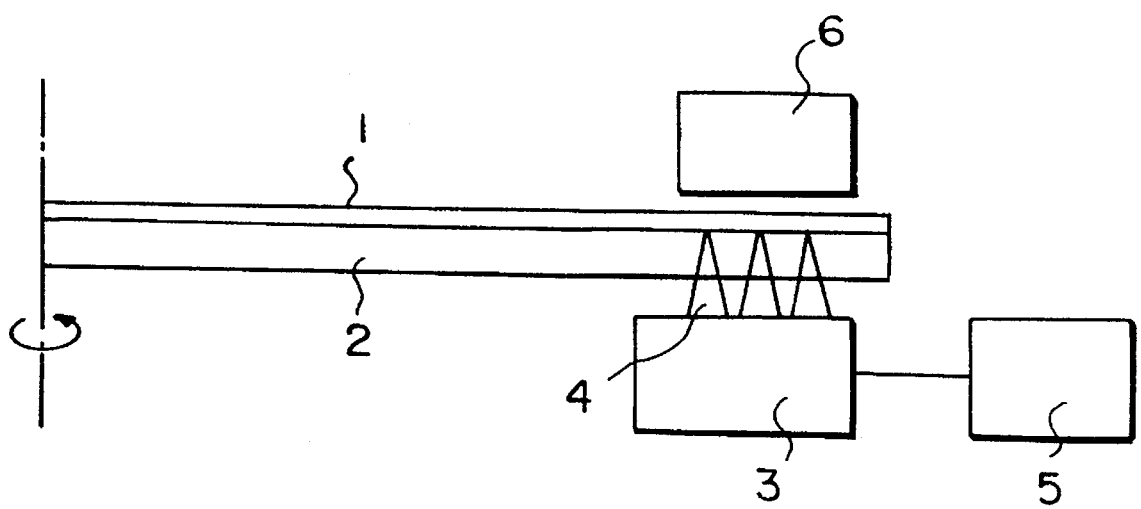
FIG. 1 is a structural view of an optical disk unit with an optical disk according to the present invention.

FIG. 1 shows a structure of an optical disk unit with an optical disk according to the present invention set therein. The optical disk includes a recording medium 1 formed on a substrate 2 which rotates by means of a spindle motor. A plurality of light beams 4 are focused on the optical disk through an optical head 3. A controller 5 controls the focusing, tracking, and accessing of the light beams 4, as well as the recording, reproduction, and deletion of information, based on a signal output from the optical head 3. In the case of using a magneto-optical disk in place of the optical disk, a magnetic field generation device 6 is required at a position opposing the optical head 3.

Figure 2A:
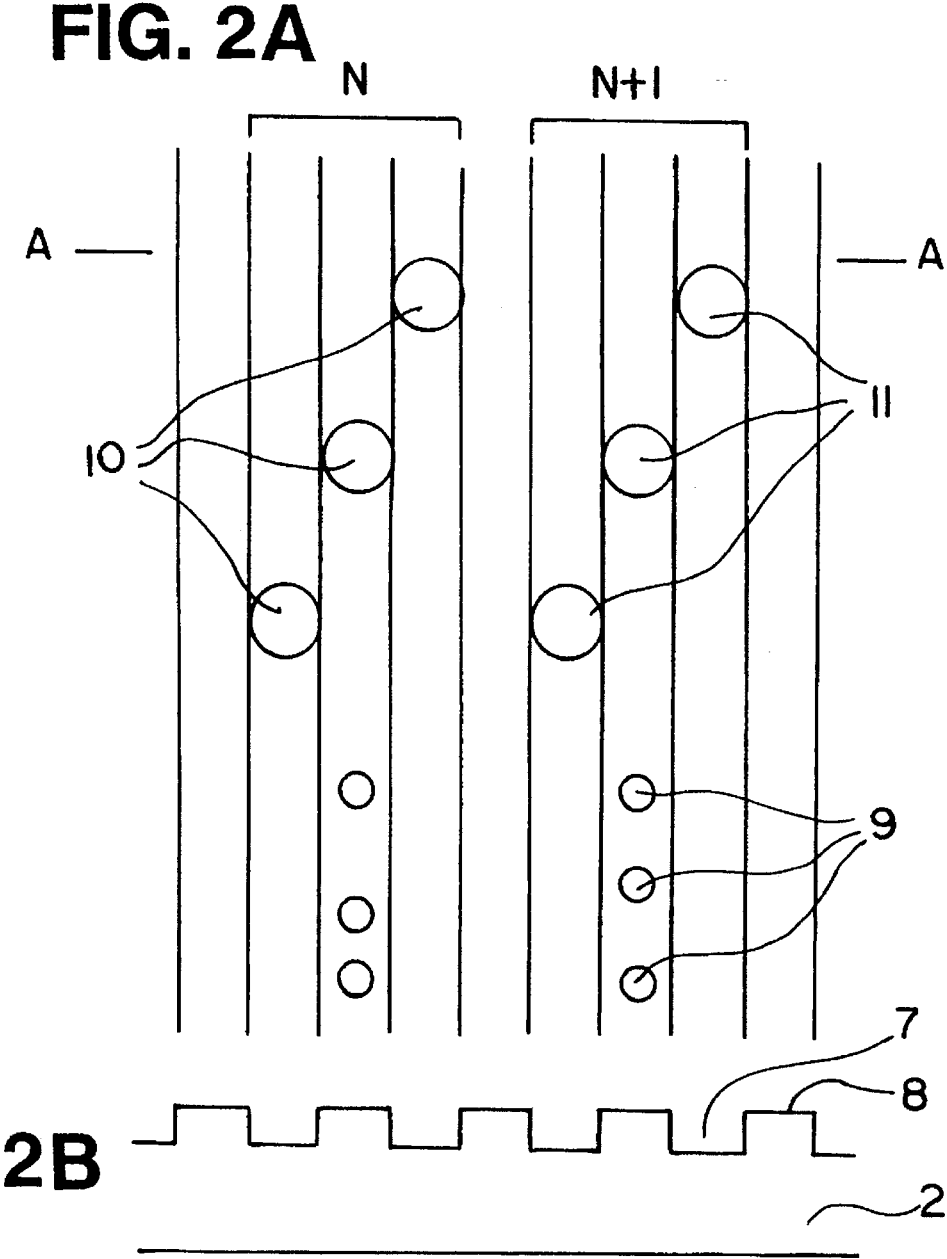
FIGS. 2A and 2B are a plan view and a sectional view, respectively, of an optical disk according to the present invention.
Figure 2B:
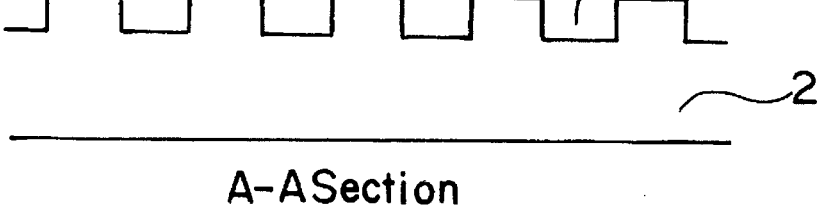

FIGS. 2A and 2B are a plan view and a sectional view, respectively, of an example of the optical disk according to the present invention. In these figures, only two tracks, Nth and (N+1)th tracks (N is a natural number) are shown together with light beams 10 and 11 positioned on the respective tracks. Each of the tracks includes two guide grooves 7, a land 8 interposed between the guide grooves 7, and a group of pits 9 formed on the land 8. In this example, three light beams are used.

The guide grooves 7 and the land 8 have substantially the same width. The difference between the widths of the guide grooves 7 and the lands 8 is preferably smaller because when the difference is greater; the characteristics of the recording, reproduction, and deletion of information of the guide grooves 7 and the lands 8 become different. The word "width" used herein refers to a width of the guide grooves 7 or the lands 8 in areas where the pits 9 are not formed. The three light beams 10 are respectively positioned on the two guide grooves 7 and the land 8 constituting the Nth track. The group of pits 9 are formed on the land 8 of each track. A succession of tracks form a spiral. Thus, when the optical disk rotates once, the light beams 10 on the Nth track move to the (N+1)th track, i.e., the position of the light beams 11. When continuous recording, reproduction, or deletion of information is desired, the light beams 11 are continuously moved on the (N+1)th track and the track next thereto. When the recording, reproduction, or deletion of information is desired at a track other than the track next to the (N+1)th track, the light beams 11 are moved across a track or tracks to a target position where information is to be recorded, reproduced, or deleted, while keeping the positional relationship among the three light beams 11. This operation of moving light beams across a track or tracks is called accessing. For example, when the light beams 11 are to be returned to the position of the light beams 10 on the Nth track, the two outer light beams among the three light beams 11 necessarily cross two lands 8. In general, when light beams move across a track or tracks to reach the Jth track (J is a natural number) from the Nth track, they are required to cross 2×|N−J| lands, wherein | | is a sign indicating an absolute value. Thus, high-speed and precise accessing can be achieved by first identifying the position of the light beams on the optical disk before the start of accessing and then counting the number of lands crossed by the light beams on the way to a target position.

In the optical disk of this example, a succession of tracks having the two guide grooves 7 and the land 8 running in parallel are formed in a spiral shape. It is also possible to form a spiral guide groove and then a group of pits on every other land so as to form tracks each composed of two guide grooves 7 and one land 8 having a group of pits 9.

FIGS. 3A and 3B show a conventional optical disk, where three guide grooves 7 are individually formed in a spiral shape, and groups of pits 9 are formed on respective lands 8 between the adjacent guide grooves 7. With this structure, when three light beams 10 move across the guide grooves 7 and the lands 8 for accessing, there arises the case where all of the three light beams 10 are positioned in an area of the surface of the optical disk where the groups of pits 9 are collectively formed (hereinafter, such an area is referred to as the pit-formation area). In such a case, the amounts of reflected light from all of the light beams 10 are varied by the pits 9. This causes noise, interrupting correct counting of the number of guide grooves 7 or lands 8 crossed by the light beam 10, and as a result high-speed and precise accessing is not possible.

On the contrary, according to the optical disk of the present invention of FIGS. 2A and 2B, since the pits 9 are formed on every other land 8, at least one of the three light beams 10 crosses the land 8 having no pits even when they move across the pit-formation area. It is therefore possible to correctly count the number of guide grooves 7 or lands 8 crossed by the light beams 10 by using a signal obtained from the light beam which has crossed the land 8 having no pits. This makes it possible to achieve high-speed and precise accessing.

FIGS. 4A and 4B show an alternative example of the optical disk of FIGS. 2A and 2B according to the present invention. In this example, the width of the portions of the guide grooves 7 located in the pit-formation area is reduced. In general, positional information is reproduced by detecting a variation in the amount of reflected light from a light beam when it passes a pit. Since the width of the lands 8 of the optical disk of FIGS. 2A and 2B is uniform, increasing the size of the pits 9 is limited. On the contrary, in the optical disk of FIGS. 4A and 4B, since the width of the lands 8 is larger in the pit-formation area, the size of the pits 9 can be increased. As a result, the variation in the amount of reflected light becomes greater, and thus stable positional information can be obtained.

Figure 5A:
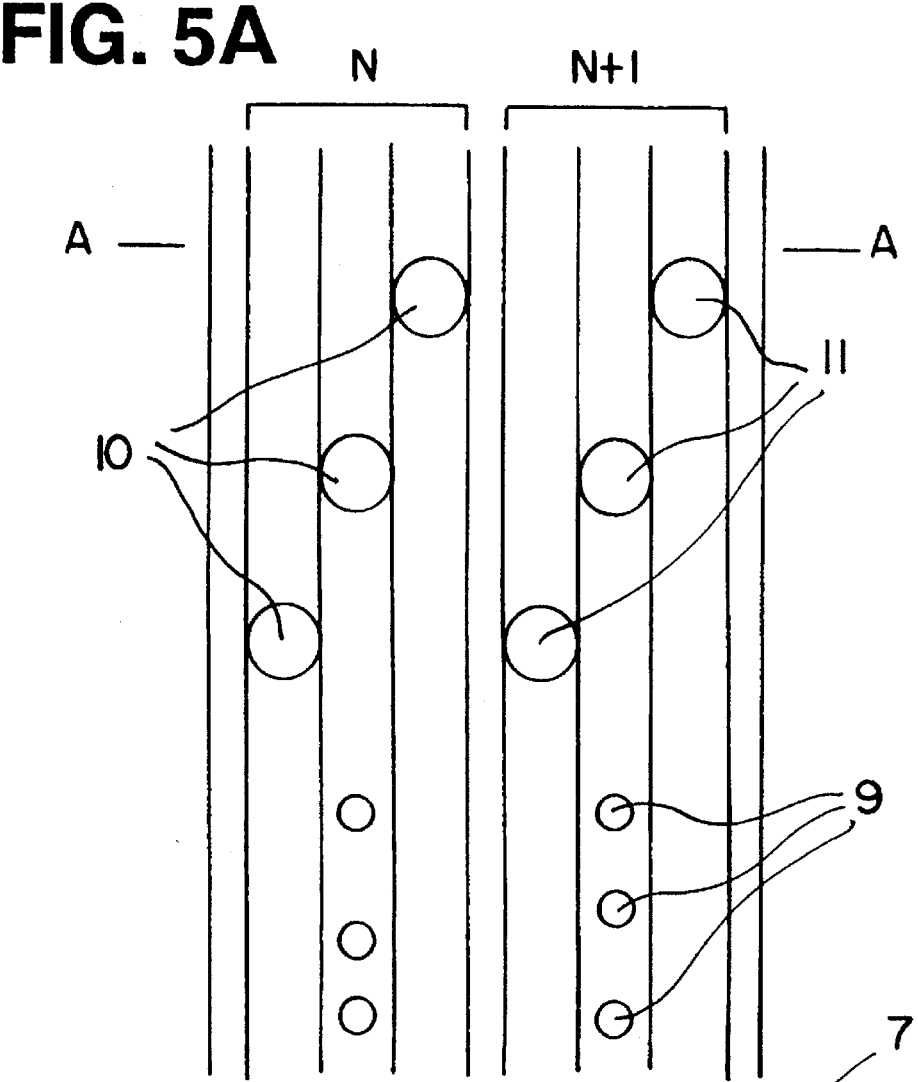
FIGS. 5A and 5B are a plan view and a sectional view, respectively, of yet another optical disk according to the present invention.
Figure 5B:
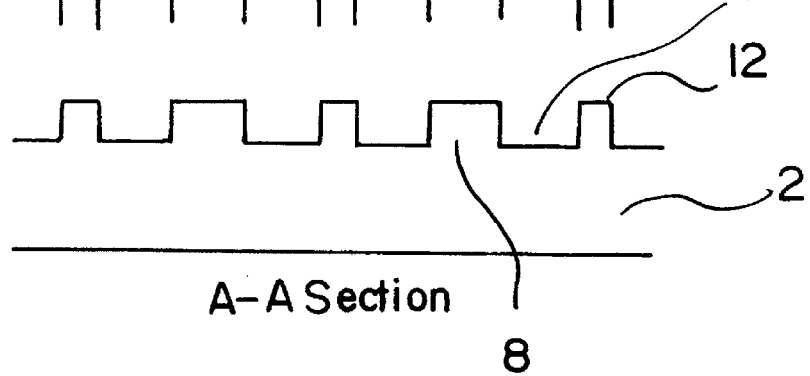

FIGS. 5A and 5B show another alternative example of the optical disk of FIGS. 2A and 2B according to the present invention. In this example, the width of lands 12 separating the adjacent tracks is made smaller than that of the lands 8 constituting the tracks. By thus reducing the width of the lands 12 which are irrelevant of the recording, reproduction, and deletion of information, the recording density of the optical disk can be further improved.

In general, guide grooves of an optical disk are formed by a laser cutting method. In the case of forming the optical disk of FIGS. 2A and 2B where all the lands have the same width, the two guide grooves 7 and the group of pits 9 constituting each track are formed by irradiating the optical disk with three argon lasers simultaneously, so as to form a succession of tracks of a spiral shape. Alternatively, the optical disk may be irradiated with two argon lasers simultaneously, so as to form one spiral guide groove and a group of pits on every track.

In the case of forming the optical disk of FIGS. 5A and 5B, the two guide grooves 7 and the group of pits 9 constituting each track are formed by irradiating the optical disk with three argon lasers simultaneously, so as to form a succession of tracks of a spiral shape keeping a predetermined fixed distance between the adjacent tracks.

Figure 6A:
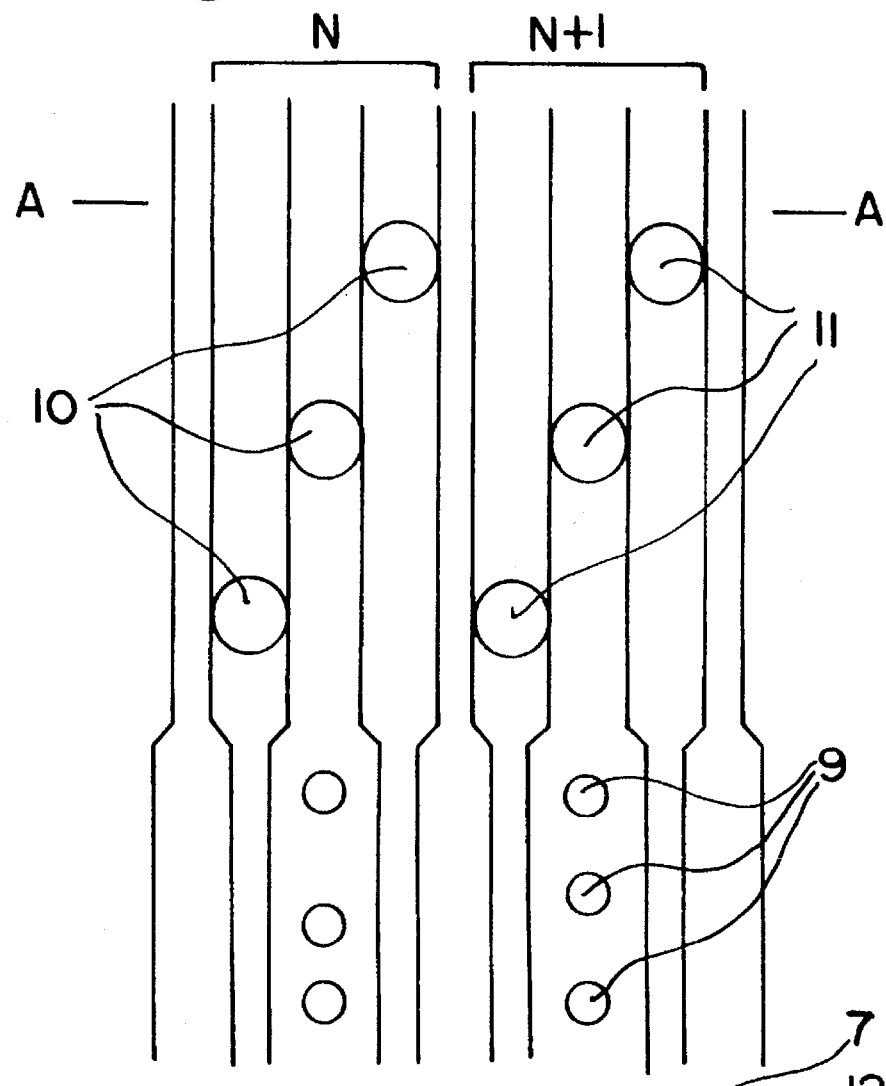
FIGS. 6A and 6B are a plan view and a sectional view, respectively, of yet another optical disk according to the present invention.
Figure 6B:
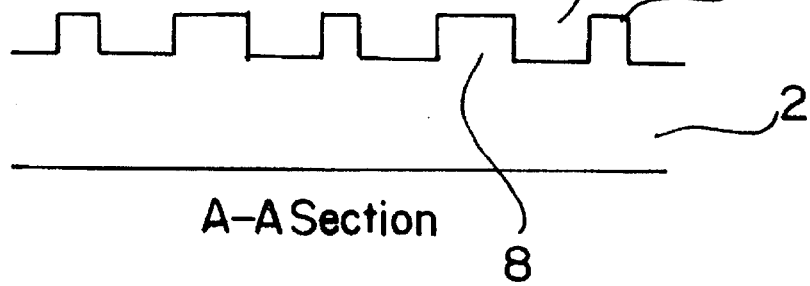

FIGS. 6A and 6B show an alternative example of the optical disk of FIGS. 5A and 5B according to the present invention. In this example, the width of the portions of the guide grooves 7 located in the pit-formation area is reduced. Accordingly, in this example, as in the example of FIGS. 4A and 4B, stable positional information can be obtained.

Figure 7A:
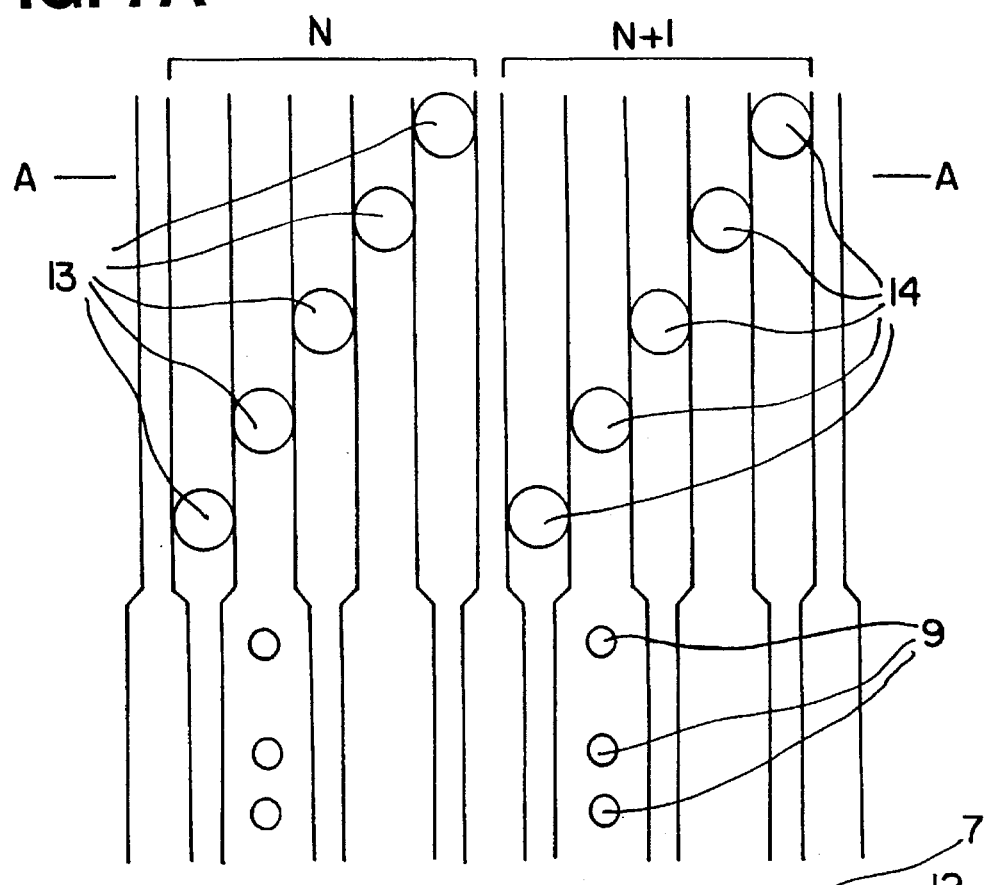
FIGS. 7A and 7B are a plan view and a sectional view, respectively, of yet another optical disk according to the present invention.
Figure 7B:
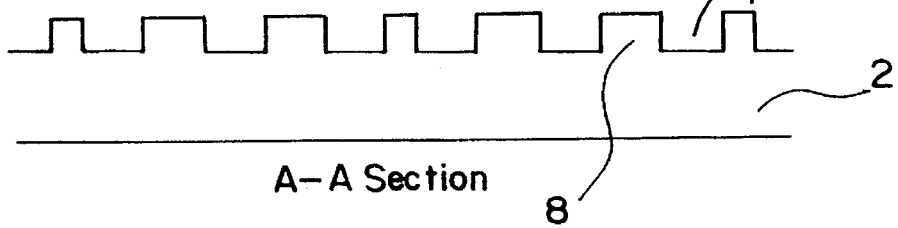

FIGS. 7A and 7B show another example of the optical disk according to the present invention. In this example, five light beams 13 or 14 are used for the recording, reproduction, and deletion of information. In the optical disk of this example, one track includes three guide grooves 7 and two lands 8 one of which has a group of pits 9 formed thereon. The width of lands 12 separating the adjacent tracks is made smaller than that of the lands 8 constituting the tracks. The optical disk of this example is based on the structure of the optical disk of FIGS. 6A and 6B. However, it will be understood that the structures of FIGS. 2A and 2B, 4A and 4B, and 5A and 5B can also be used for the realization of optical disks using five light beams. Since the optical disk of FIGS. 7A and 7B has one additional land 8 having no pits, more precise accessing is possible compared with the optical disk of FIGS. 6A and 6B.

Figure 8A:
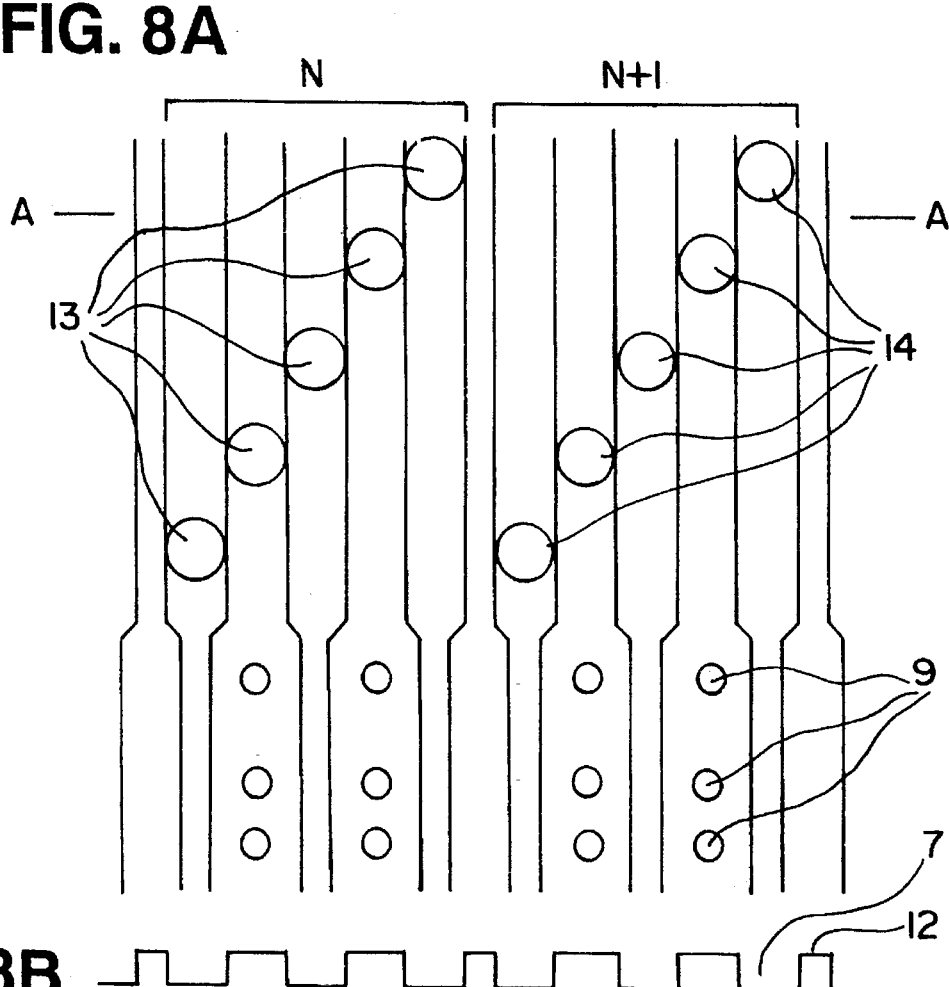
FIGS. 8A and 8B are a plan view and a sectional view, respectively, of yet another optical disk according to the present invention.
Figure 8B:
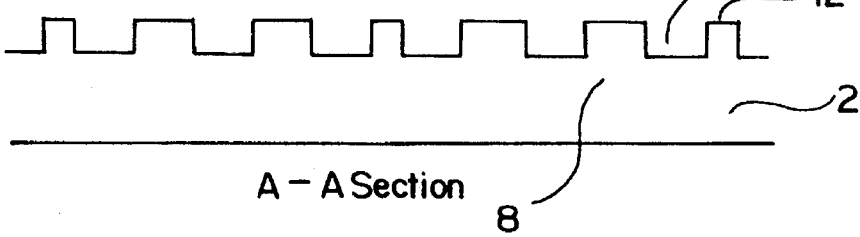

FIGS. 8A and 8B show an alternative example of the optical disk of FIGS. 7A and 7B. In this example, two groups of pits 9 are formed on the two lands 8 constituting each track. Units of information produced by the two groups of pits 9 formed on the two lands 8 are preferably identical to each other. The precision of the accessing is in the same level as that obtained by the optical disk of FIGS. 6A and 6B. However, more precise positional information can be obtained by using the two light beams passing the two lands 8 having the pits 9.

Figure 9A:
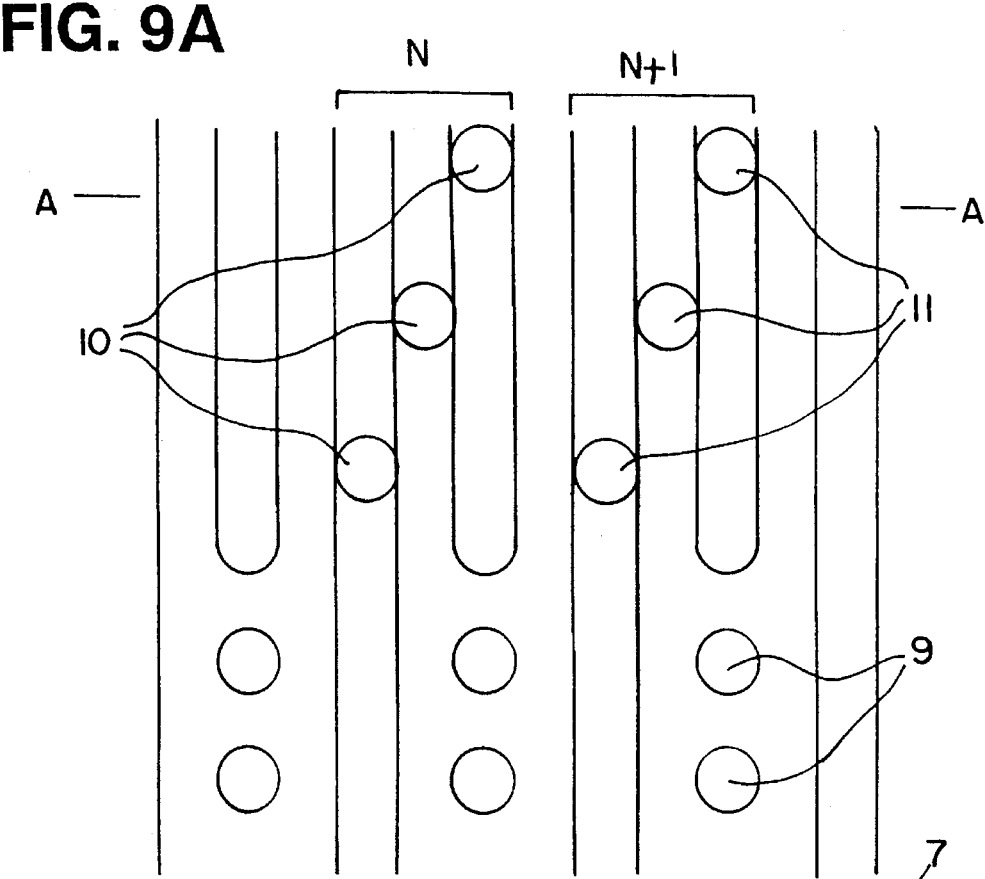
FIGS. 9A and 9B are a plan view and a sectional view, respectively, of yet another optical disk according to the present invention.
Figure 9B:
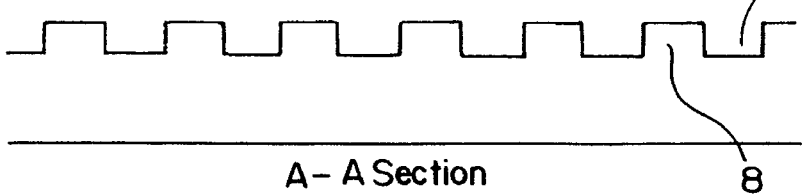

FIGS. 9A and 9B are a plan view and a sectional view, respectively, of yet another example of the optical disk according to the present invention. In these figures, two tracks, Nth and (N+1)th tracks (N is a natural number) are shown together with light beams 10 and 11 positioned on the respective tracks. Each of the tracks includes two guide grooves 7, a land 8 interposed between the guide grooves 7, and a group of pits 9 formed in line with one of the guide grooves 7. In this example, three light beams are used.

The guide grooves 7 and the land 8 have substantially the same width. The difference between the widths of the guide grooves 7 and the lands 8 is preferably smaller because, when the difference is greater, the characteristics of the recording, reproduction, and deletion of information of the guide grooves 7 and the lands 8 become different. The word "width" used in this context refers to a width of the guide grooves 7 or the lands 8 in areas where the pits 9 are not formed. The three light beams 10 are respectively positioned on the two guide grooves 7 and the land 8 constituting the Nth track. A succession of the tracks form a spiral. Thus, when the optical disk rotates once, the light beams 10 on the Nth track move to the (N+1)th track, i.e., the position of the light beams 11. When continuous recording, reproduction, or deletion of information is desired, the light beams 11 are continuously moved on the (N+1)th track and the track next thereto. When the recording, reproduction, or deletion of information is desired at a track other than the track next to the (N+1)th track, the light beams 11 are moved across a track or tracks to a target position where information is to be recorded, reproduced, or deleted, while keeping the positional relationship among the three light beams 11. For example, when the light beams 11 are to be returned to the position of the light beams 10 on the Nth track, the two outer light beams among the three light beams 11 necessarily cross two lands 8. In general, when light beams move across a track or tracks to reach the Jth track (J is a natural number) from the Nth track, they are required to cross 2×|N−J| lands.

In the optical disk of this example, a succession of tracks having the two guide grooves 7 and the land 8 running in parallel are formed in a spiral shape. It is also possible to form two spiral guide grooves 7 individually and to form groups of the pits 9 in line with one of the guide grooves 7, so as to form tracks each composed of two guide grooves 7 and one land 8. Thus, in this example, as in the optical disk of FIGS. 2A and 2B, there exists one guide groove 7 or one land 8 having no pits in one track. Accordingly, at least one of the three light beams crosses the guide groove 7 having no pits even when they move across the pit-formation area. It is therefore possible to correctly count the number of guide grooves 7 or lands 8 crossed by the light beams by using a signal obtained from the light beam which has crossed the guide groove 7 having no pits. This makes it possible to achieve high-speed and precise accessing.

Figure 10A:
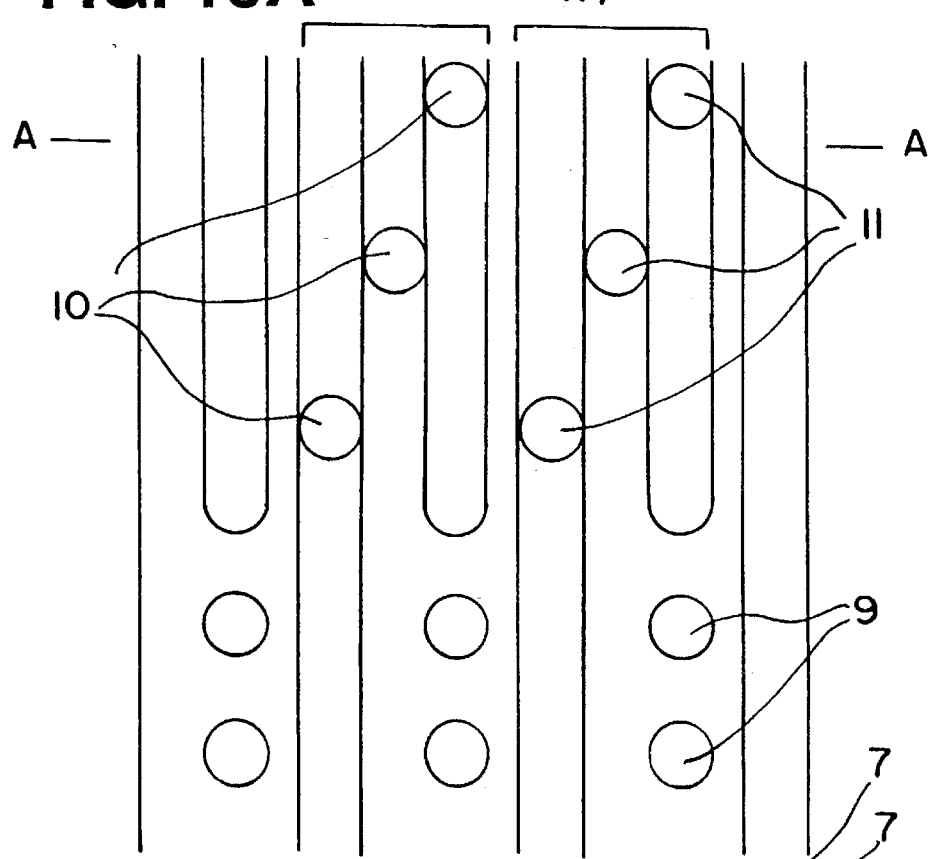
FIGS. 10A and 10B are a plan view and a sectional view, respectively, of yet another optical disk according to the present invention.
Figure 10B:
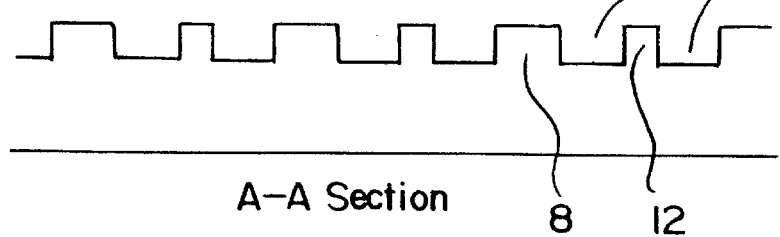

FIGS. 10A and 10B show an alternative example of the optical disk of FIGS. 9A and 9B. In. this example, the width of lands 12 separating the adjacent tracks is made smaller than that of the lands 8 constituting the tracks. By thus reducing the width of the lands 12 which are irrelevant of the recording, reproduction, and deletion of information, the recording density of the optical disk can be further improved.

In general, guide grooves of an optical disk are formed by a laser cutting method. In the case of forming the optical disk of FIGS. 9A and 9B where all of the lands have the same width, the two guide grooves 7 and the group of pits 9 constituting each track are formed by irradiating the optical disk with two argon lasers simultaneously, so as to form a succession of tracks of a spiral shape. Alternatively, the optical disk may be irradiated with one argon laser, so as to form one guide groove and a group of pits in line with every other guide groove to form each.

In the case of forming the optical disk of FIGS. 10A and 10B, the two guide grooves 7 and the group of pits 9 constituting each track are formed by irradiating the optical disk with two argon lasers simultaneously, so as to form a succession of tracks of a spiral shape keeping a fixed distance between the adjacent tracks.

Figure 11A:
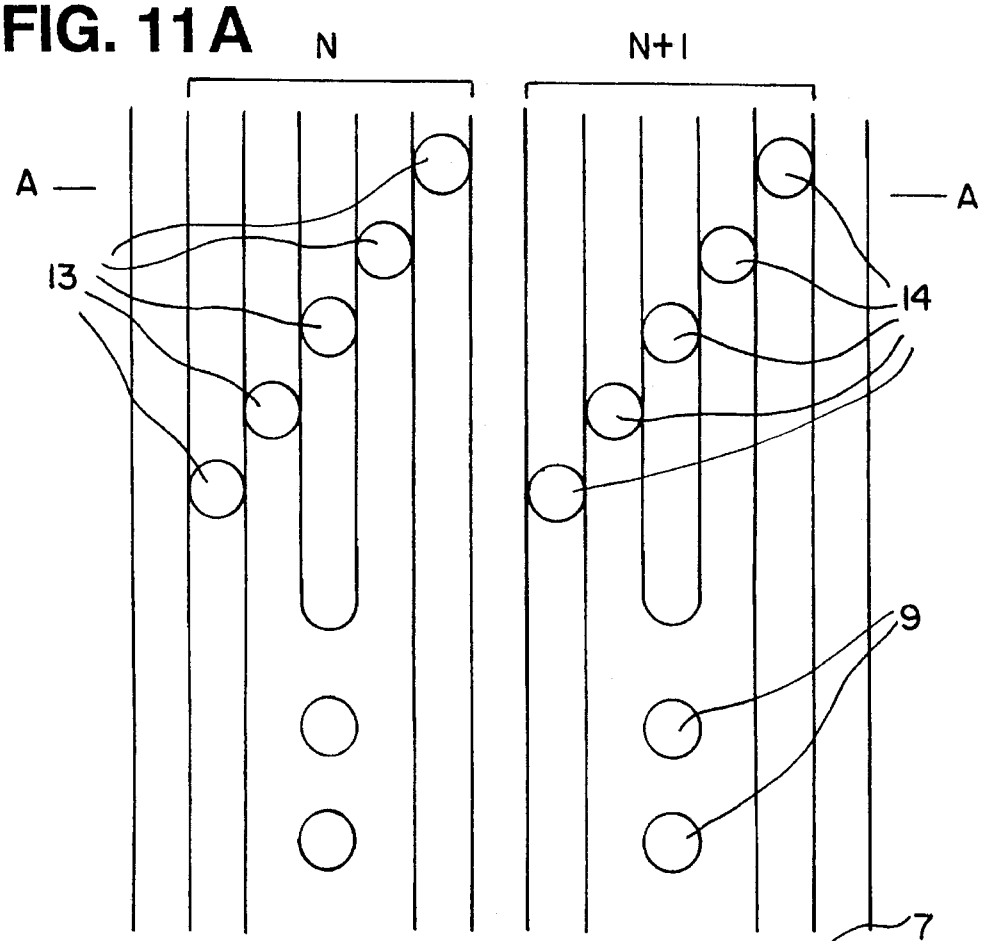
FIGS. 11A and 11B are a plan view and a sectional view, respectively, of yet another optical disk according to the present invention.
Figure 11B:
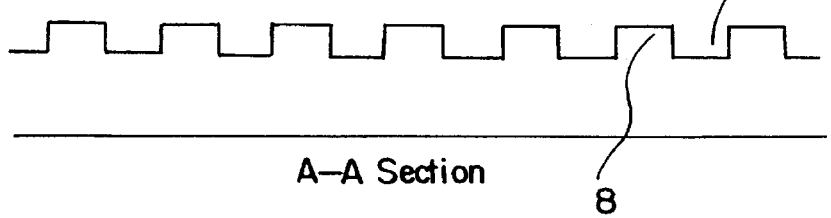

FIGS. 11A and 11B show yet another example of the optical disk according to the present invention. In this example, five light beams 13 or 14 are used for the recording, reproduction, and deletion of information. In the optical disk of this example, one track includes three guide grooves 7, two lands 8, and a group of pits 9 formed in line with one of the three guide grooves 7. Since the optical disk of FIGS. 11A and 11B has one additional guide groove 8 having no pits, more precise accessing is possible compared with the optical disk of FIGS. 9A and 9B.

Figure 12:
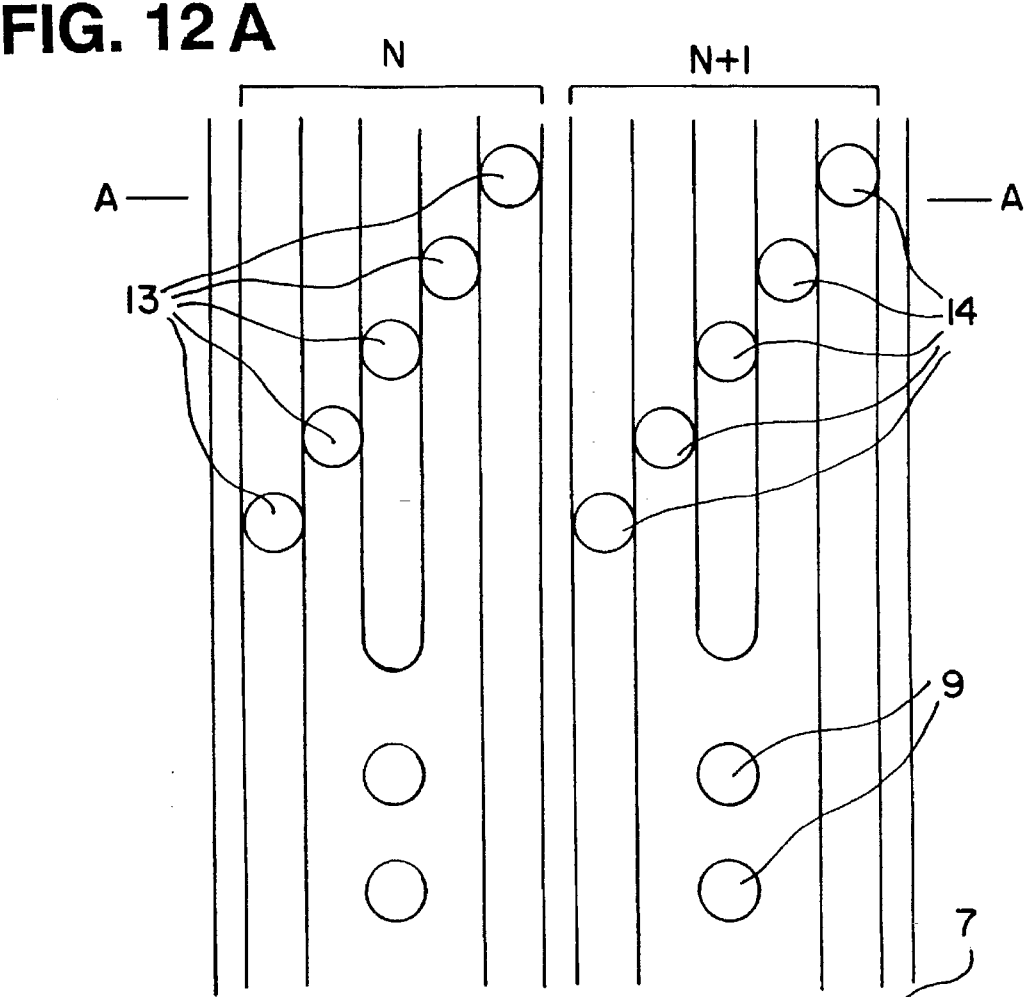
FIGS. 12A and 12B are a plan view and a sectional view, respectively, of yet another optical disk according to the present invention.
Figure 12B:
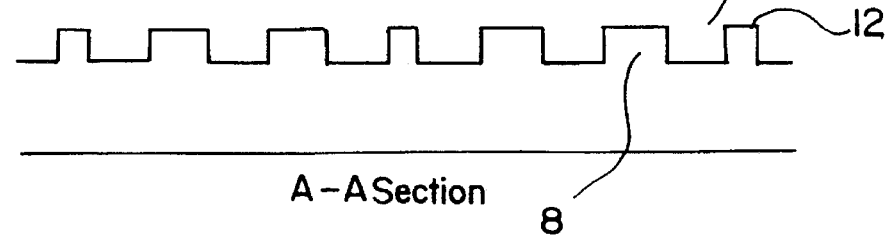

FIGS. 12A and 12B show an alternative example of the optical disk of FIGS. 11A and 11B according to the present invention. In this example, the width of lands 12 separating the adjacent tracks is made smaller than that of the lands 8 constituting the tracks. With this structure, the recording density of the optical disk of this example can be further improved compared with the optical disk of FIGS. 11A and 11B.

Figure 13:
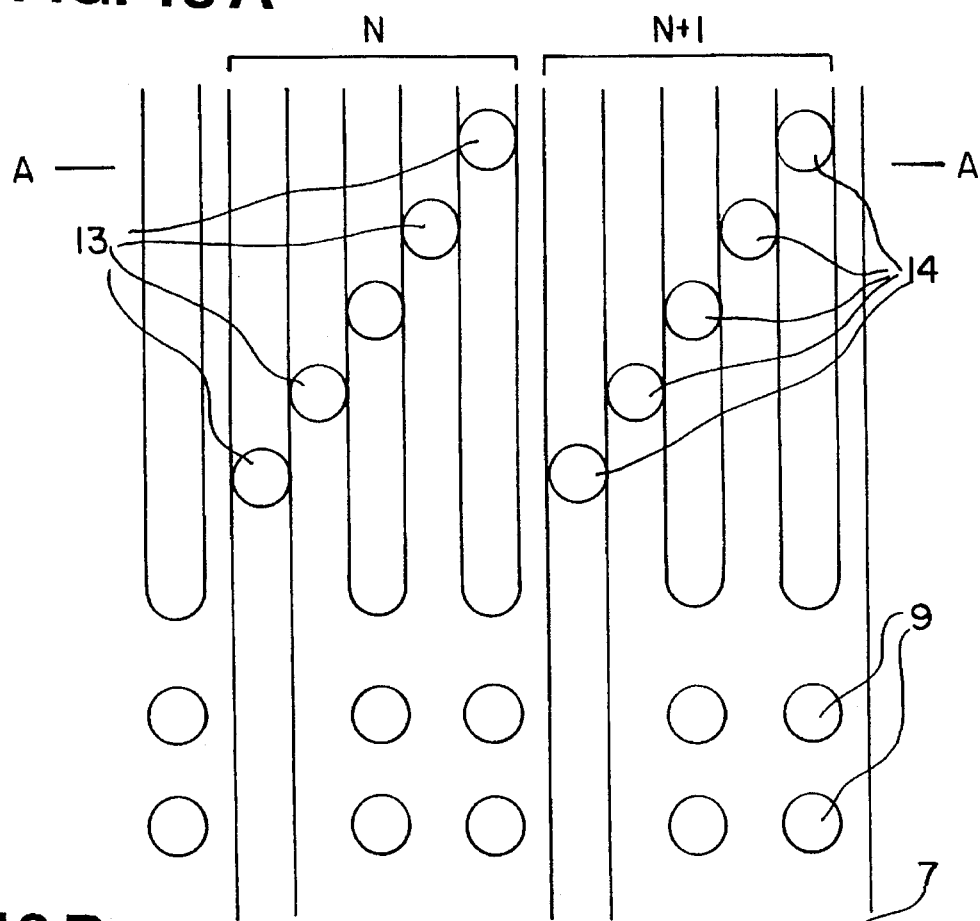
FIGS. 13A and 13B are a plan view and a sectional view, respectively, of yet another optical disk according to the present invention.
Figure 13:
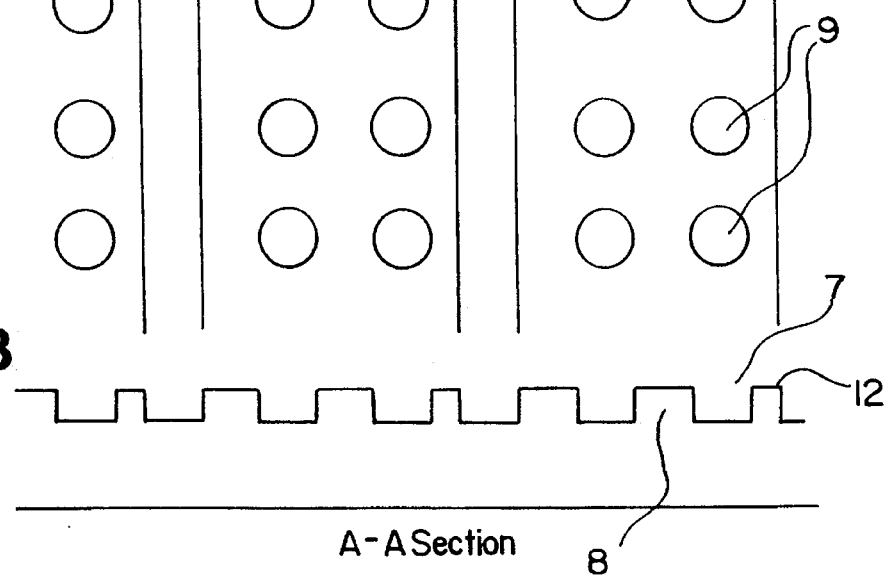

FIGS. 13A and 13B show an alternative example of the optical disk of FIGS. 12A and 12B. In this example, two groups of pits 9 are formed in line with two guide grooves 7 constituting each track. Units of information produced by the two groups of pits 9 formed in line with the two guide grooves 7 are preferably identical to each other. The precision of the accessing is in the same level as that obtained by the optical disk of FIGS. 10A and 10B. However, more precise positional information can be obtained by using two light beams among the five light beams passing the two groups of pits 9.

In the optical disks of FIGS. 9A and 9B through 13A and 13B, the diameter of the pits 9 and the width of the guide grooves 7 are identical to each other. However, the diameter of the pits 9 should be optimized corresponding to the diameter of the light beams 10. For example, when the diameter of the light beams 10 is 0.9 μm, the diameter of the pits 9 is preferably in the range of 0.3 μm to 0.5 μm in order to obtain a large variation in the amount of reflected light.

Magneto-optical disks according to the above respective examples were manufactured to test the reproduction of pit information and the precision of accessing as follows.

A magneto-optical disk according to the example of FIGS. 2A and 2B was manufactured in the following manner. A succession of tracks including two guide grooves 7 having a width of 0.7 μm and a depth of 60 nm and one land 8 were formed on a glass disk substrate at a pitch of 2.8 μm. A group of pits 9 having a diameter of 0.3 μm and a depth of 60 nm were formed on the land 8 constituting each track. The thus-manufactured magneto-optical disk was set in a magneto-optical disk unit capable of conducting the recording, reproduction, and deletion of information using three light beams, and the reproduction of pit information was tested. As a result, a satisfactory pit information signal was obtained. Also, the detection of a variation in the amount of reflected light from the light beams when they cross the lands 8 was ensured by using the total of the amounts of reflected light from the two outer light beams. As a result, the number of lands crossed by the light beams was correctly counted.

For comparison, the same test was conducted for the conventional optical disk of FIGS. 3A and 3B. As a result, a count error occurred while counting the number of lands 8 when the light beams crossed the pit-formation area of the magneto-optical disk.

In the above magneto-optical disk, the depths of the guide grooves and the pits were both 60 nm. A similar result was obtained when the depth of the pits was made 120 nm while the depth of the guide grooves was 60 nm. In general, optimal depths of guide grooves and pits of an optical disk are $\lambda/(8n)$ and $\lambda/(4n)$, respectively, wherein $\lambda$ is the wavelength of a semiconductor laser used for an optical disk unit, and n is the diffractive index of a substrate of the optical disk. This applies to the optical disk according to the present invention.

A magneto-optical disk according to the example of FIGS. 4A and 4B was manufactured in the following manner. A succession of tracks including two guide grooves 7 having a width of 0.7 μm and a depth of 60 nm and one land 8 were formed on a glass disk substrate at a pitch of 2.8 μm. In this case, the width of the guide grooves 7 was reduced to 0.4 μm and the width of the lands 8 was increased to 1.0 μm in the pit-formation area. A group of pits 9 having a diameter of 0.4 μm and a depth of 60 nm were formed on the widened land 8 constituting each track. The thus-manufactured magneto-optical disk was set in a magneto-optical disk unit capable of conducting the recording, reproduction, and deletion of information using three light beams, and the reproduction of pit information was tested. As a result, a more satisfactory pit information signal than that obtained by the magneto-optical disk according to the example of FIGS. 2A and 2B was obtained. Also, the detection of a variation in the amount of reflected light from the light beams when they cross the lands 8 was ensured by using the total of the amounts of reflected light from the two outer light beams. As a result, the number of lands crossed by the light beams was correctly counted. When the diameter of the light beams is 0.9 μm, the diameter of the pits is preferably in the range of 0.3 to 0.5 μm, and the width of the guide grooves is preferably in the range of 0.3 to 0.6 μm. The diameter of the light beams as used herein refers to a diameter where the intensity of the light beams at the periphery thereof is a half of that at the center thereof.

A magneto-optical disk according to the example of FIGS. 5A and 5B was manufactured in the following manner. A succession of tracks including two guide grooves 7 having a width of 0.7 μm and a depth of 60 nm and one land 8 were formed on a glass disk substrate at a pitch of 2.4 μm. A group of pits 9 having a diameter of 0.3 μm and a depth of 60 nm were formed on the lands 8 constituting each track. The thus-manufactured magneto-optical disk was set in a magneto-optical disk unit capable of conducting the recording, reproduction, and deletion of information using three light beams, and the reproduction of pit information was tested. As a result, a satisfactory pit information signal was obtained. Also, the detection of a variation in the amount of reflected light from the light beams when they crossed the lands 8 was ensured by using the total of the amounts of reflected light from the two outer light beams. As a result, the number of lands crossed by the light beams was correctly counted. In this case, the width of the lands 12 separating the tracks is 0.4 μm, which is smaller than that of the equivalents of the magneto-optical disk according to the example of FIGS. 2A and 2B (i.e., 0.7 μm, which is the same as that of the other lands 8 constituting the tracks). With these narrowed lands 12, it was possible to improve the recording density of the magneto-optical disk.

A magneto-optical disk according to the example of FIGS. 6A and 6B was manufactured in the following manner. A succession of tracks including two guide grooves 7 having a width of 0.7 μm and a depth of 60 nm and one land 8 were formed on a glass disk substrate at a pitch of 2.4 μm. In this case, the width of the guide grooves 7 was reduced to 0.4 μm in the pit-formation area. A group of pits 9 having a diameter of 0.4 μm and a depth of 60 nm were formed on the widened land 8 constituting each track. The thus-manufactured magneto-optical disk was set in a magneto-optical disk unit capable of conducting the recording, reproduction, and deletion of information using three light beams, and the reproduction of pit information was tested. As a result, a more satisfactory pit information signal than that obtained by the magneto-optical disk according to the example of FIGS. 5A and 5B. Also, the detection of a variation in the amount of reflected light from the light beams when they cross the lands 8 was ensured by using the total of the amounts of reflected light from the three light beams. As a result, the number of lands crossed by the light beams was correctly counted.

A magneto-optical disk according to the example of FIGS. 7A and 7B was manufactured in the following manner. A succession of tracks including three guide grooves 7 having a width of 0.7 μm and a depth of 60 nm and two lands 8 were formed on a glass disk substrate at a pitch of 3.9 μm. In this case, the width of the guide grooves 7 was reduced to 0.4 μm in the pit-formation area. A group of pits 9 having a diameter of 0.4 μm and a depth of 60 nm were formed on one land 8 constituting each track. The thus-manufactured magneto-optical disk was set in a magneto-optical disk unit capable of conducting the recording, reproduction, and deletion of information using five light beams, and the reproduction of pit information was tested. As a result, a satisfactory pit information signal was obtained, and moreover read error of pit information greatly reduced. Also, the detection of a variation in the amount of reflected light from the light beams when they cross the lands 8 was ensured by using the total of the amounts of reflected light from the center and two outermost light beams among the five light beams. As a result, the number of lands crossed by the light beams was correctly counted.

A magneto-optical disk according to the example of FIGS. 8A and 8B was manufactured in the following manner. A succession of tracks including three guide grooves 7 having a width of 0.7 μm and a depth of 60 nm and two lands 8 were formed on a glass disk substrate at a pitch of 3.9 μm. In this case, the width of the guide grooves 7 was reduced to 0.4 μm in the pit-formation area. Two groups of pits 9 having a diameter of 0.4 μm and a depth of 60 nm were formed on the two lands 8 constituting each track. The thus-manufactured magneto-optical disk was set in a magneto-optical disk unit capable of conducting the recording, reproduction, and deletion of information using five light beams. Two units of pit information produced by the groups of pits on the two lands 8 were reproduced by two light beams passing the two lands 8, so as to determine positional information from the two units of pit information. As a result, a satisfactory pit information signal was obtained, and read errors of pit information greatly reduced. Also, the detection of a variation in the amount of reflected light from the light beams when they cross the lands 8 was ensured by using the total of the amounts of reflected light from the center and two outermost light beams among the five light beams. As a result, the number of lands crossed by the light beams was correctly counted.

A magneto-optical disk according to the example of FIGS. 9A and 9B was manufactured in the following manner. A succession of tracks including two guide grooves 7 having a width of 0.7 μm and a depth of 60 nm and one land 8 were formed on a glass disk substrate at a pitch of 2.8 μm. A group of pits 9 having a diameter of 0.7 μm and a depth of 60 nm were formed in line with one of the guide grooves 7 constituting each track. The thus-manufactured magneto-optical disk was set in a magneto-optical disk unit capable of conducting the recording, reproduction, and deletion of information using three light beams, and the reproduction of pit information was tested. As a result, a satisfactory pit information signal was obtained. Also, the detection of a variation in the amount of reflected light from the light beams when they cross the lands 8 was ensured by using the total of the amounts of reflected light from the two outer beams. As a result, the number of lands crossed by the light beams was correctly counted. The diameter of the pits is preferably in the range of 0.3 to 0.5 μm when the diameter of the light beam is 0.9 μm.

A magneto-optical disk according to the example of FIGS. 10A and 10B was manufactured in the following manner. A succession of tracks including two guide grooves 7 having a width of 0.7 μm and a depth of 60 nm and one land 8 were formed on a glass disk substrate at a pitch of 2.4 μm. A group of pits 9 having a diameter of 0.7 μm and a depth of 60 nm were formed in line with one of the guide grooves 7 constituting each track. The thus-manufactured magneto-optical disk was set in a magneto-optical disk unit capable of conducting the recording, reproduction, and deletion of information using three light beams, and the reproduction of pit information was tested. As a result, a satisfactory pit information signal was obtained. Also, the detection of a variation in the amount of reflected light from the light beams when they cross the lands 8 was ensured by using the total of the amounts of reflected light from the two outer beams. As a result, the number of lands crossed by the light beams was correctly counted. In this case, the width is smaller than that of the equivalents of the magneto-optical disk according to FIGS. 9A and 9B, i.e., 0.7 μm, which is the same as that of the other lands 8 constituting the tracks. With these narrowed lands 12, since the width of the lands separating the tracks was 0.4 μm, it was possible to improve the recording density of the magneto-optical disk.

A magneto-optical disk according to the example of FIGS. 11A and 11B was manufactured in the following manner. A succession of tracks including three guide grooves 7 having a width of 0.7 μm and a depth of 60 nm and two lands 8 were formed on a glass disk substrate at a pitch of 4.2 μm. A group of pits 9 having a diameter of 0.7 μm and a depth of 60 nm were formed in line with one of the guide grooves 7 constituting each track. The thus-manufactured magneto-optical disk was set in a magneto-optical disk unit capable of conducting the recording, reproduction, and deletion of information using five light beams, and the reproduction of pit information was tested. As a result, a satisfactory pit information signal was obtained. Also, the detection of a variation in the amount of reflected light from the light beams when they cross the lands 8 was ensured by using the total of the amounts of reflected light from the center and two outermost light beams among the five light beams. As a result, the number of lands crossed by the light beams was correctly counted.

A magneto-optical disk according to the example of FIGS. 12A and 12B was manufactured in the following manner. A succession of tracks including three guide grooves 7 having a width of 0.7 µm and a depth of 60 nm and two lands 8 were formed on a glass disk substrate at a pitch of 3.9 µm. A group of pits 9 having a diameter of 0.7 µm and a depth of 60 nm were formed in line with one of the guide grooves 7 constituting each track. The thus-manufactured magneto-optical disk was set in a magneto-optical disk unit capable of conducting the recording, reproduction, and deletion of information using five light beams, and the reproduction of pit information was tested. As a result, a satisfactory pit information signal was obtained. Also, the detection of a variation in the amount of reflected light from the five light beams when they cross the lands 8 was ensured by using the total of the amounts of reflected light from the center and two outermost light beams among the five light beams. As a result, the number of lands crossed by the light beams was correctly counted. In this case, the width of the lands 12 separating the tracks is 0.4 µm which is smaller than that of the equivalents of the magneto-optical disk according to the example of FIGS. 11A and 11B (i.e., 0.7 µm, which is the same as that of the other lands 8 constituting the tracks). With these narrowed lands 12, it was possible to improve the recording density of the magneto-optical disk.

A magneto-optical disk according to the example of FIGS. 13A and 13B was manufactured in the following manner. A succession of tracks including three guide grooves 7 having a width of 0.7 µm and a depth of 60 nm and two lands 8 were formed on a glass disk substrate at a pitch of 3.9 µm. Groups of pits 9 having a diameter of 0.7 µm and a depth of 60 nm were formed in line with two guide grooves 7 constituting each track. The thus-manufactured magneto-optical disk was set in a magneto-optical disk unit capable of conducting the recording, reproduction, and deletion of information using five light beams. Two units of pit information produced by the groups of pits 9 formed in line with the two guide grooves 7 were reproduced by two light beams passing the two guide grooves 7, so as to determine positional information from the two units of pit information. As a result, a satisfactory pit information signal was obtained, and read errors of pit information greatly reduced. Also, the detection of a variation in the amount of reflected light from the light beams when they cross the lands 8 was ensured by using the total of the amounts of reflected light from the center and two outermost light beams among the five light beams. As a result, the number of lands crossed by the light beams was correctly counted.

In the above magneto-optical disks according to the example of FIGS. 9A and 9B through 13A and 13B, the diameter of the pits 9 were reduced to 0.4 µm from 0.7 µm, and the same test was conducted. As a result, it was found that a pit information signal with higher output was obtained when the diameter of the pits 9 was 0.4 µm.

Figure 14A:
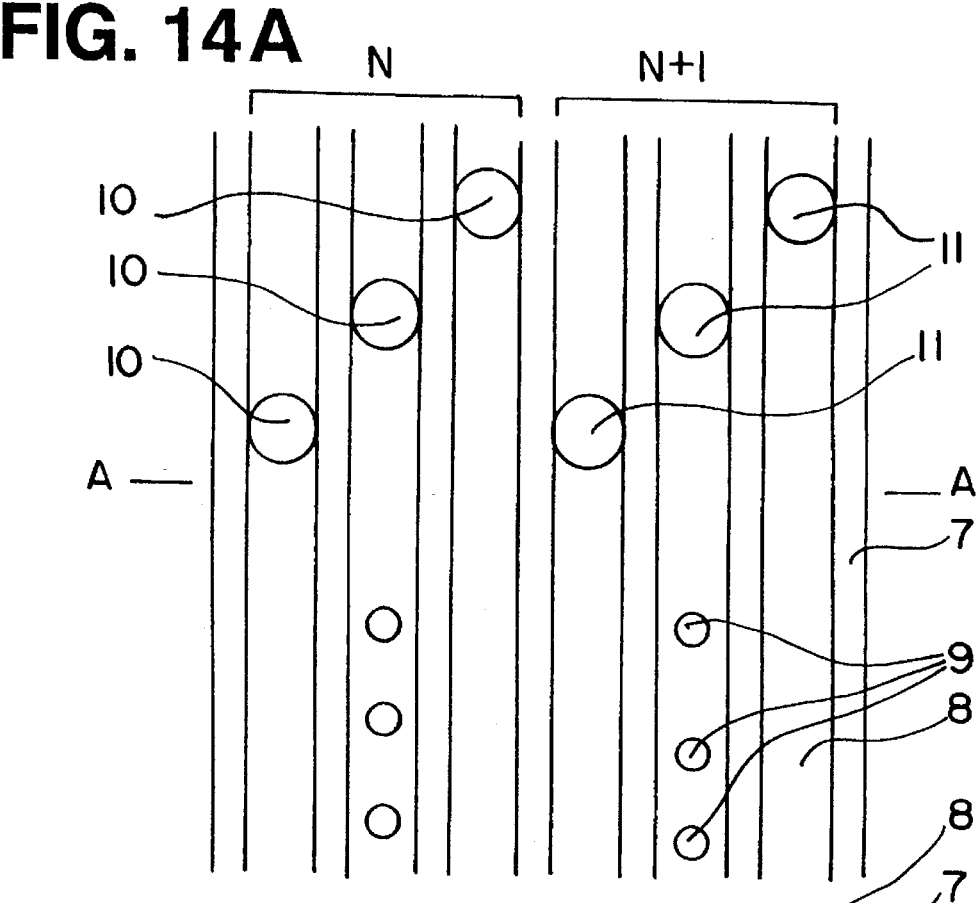
FIGS. 14A and 14B are a plan view and a sectional view, respectively, of yet another optical disk according to the present invention.
Figure 14B:
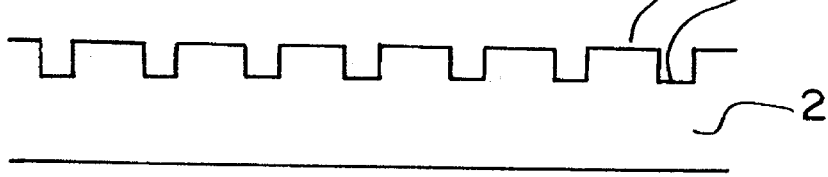

FIGS. 14A and 14B are a plan view and a sectional view, respectively, of yet another example of the optical disk according to the present invention. In these figures, only two tracks, Nth and (N+1)th tracks, are shown together with light beams 10 and 11 positioned on the respective tracks. Each of the tracks includes three lands 8 formed between guide grooves 7. A group of pits 9 are formed on the center land among the three lands 8. Three light beams are positioned on the three lands 8. A succession of tracks form a spiral. Thus, when the optical disk rotates once, the light beams 10 on the Nth track move to the (N+1)th track, i.e., the position of the light beams 11. When continuous recording, reproduction, and deletion of information is desired, the light beams 11 continue moving on the (N+1)th track. When the recording, reproduction, and deletion of information is desired at a track other than the track next to the (N+1)th track, the light beams 11 are moved across a track or tracks to a target position where information is to be recorded, reproduced, or deleted, while keeping the positional relationship among the three light beams 11. For example, when the light beams 11 are to be returned to the position of the light beams 10 on the Nth track, the respective light beams 11 necessarily cross three guide grooves 7. In general, when light beams move across a track or tracks to reach the Jth track (J is a natural number) from the Nth track, they are required to cross 3×|N−J| guide grooves.

In the optical disk of this example, three guide grooves 7 are formed in a spiral shape in parallel. It is also possible to form the guide grooves 7 individually in a spiral shape and then to form the pits 9 on every third land 8, so as to complete one track with three lands 8.

In the optical disk of FIGS. 14A and 14B, the pits 9 are formed on every third land 8 as described above. Therefore, at least one of the three light beams 10 crosses the land 8 having no pits even when they move across the pit-formation area. It is therefore possible to correctly count the number of guide grooves 7 crossed by the light beams 10 by using a signal obtained from the light beam which has crossed the land 8 having no pits. This makes it possible to achieve high-speed and precise accessing.

Figure 15A:
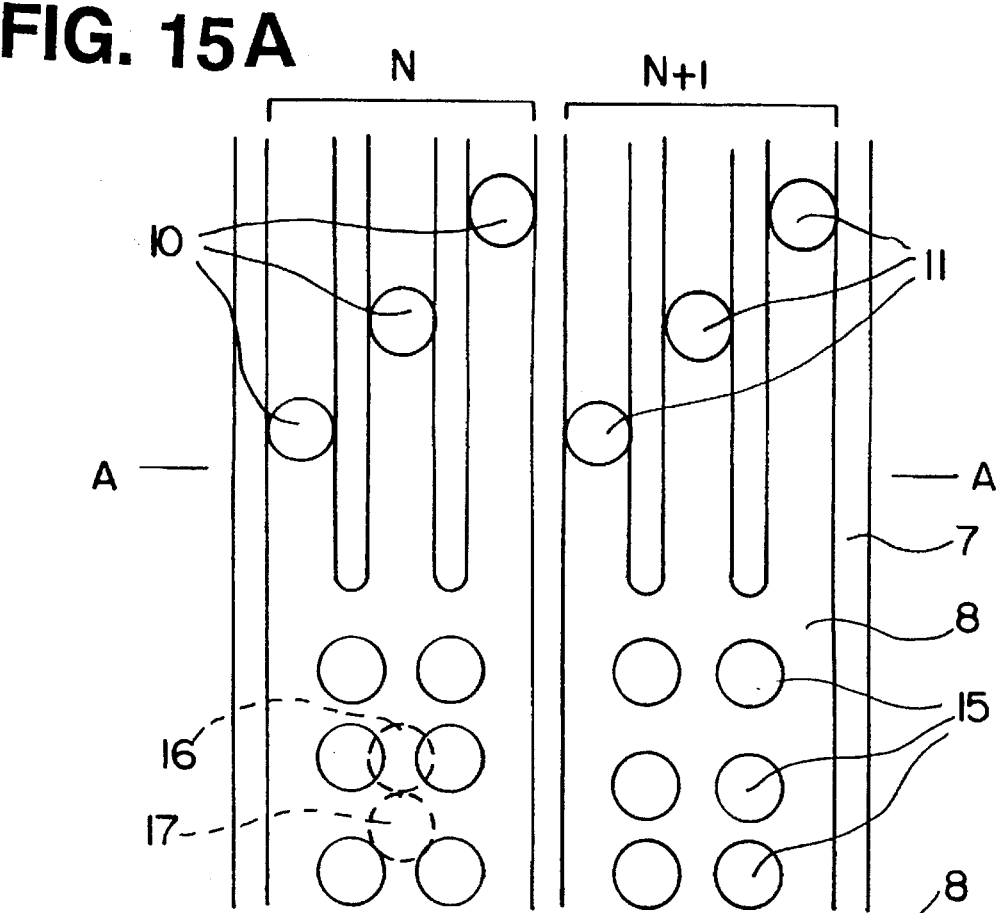
FIGS. 15A and 15B are a plan view and a sectional view, respectively, of yet another optical disk according to the present invention.
Figure 15B:
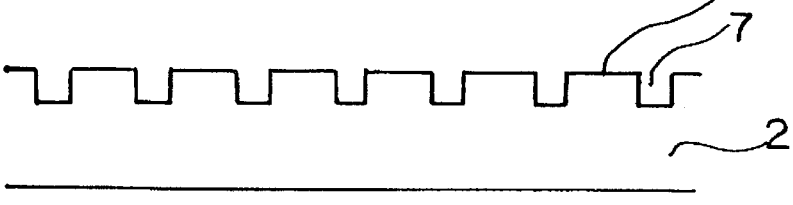

FIGS. 15A and 15B are a plan view and a sectional view, respectively, of an alternative example of the optical disk of FIGS. 14A and 14B according to the present invention. In this example, as in the example of FIGS. 14A and 14B, three light beams 10 are positioned on the three lands 8 constituting one track for the recording, reproduction, and deletion of information. Two identical groups of pits 15 are formed in line with two guide grooves 7 located inside of each track. Now, how the information stored by the pits 15 is reproduced will be described. The center light beam among the three light beams 10 moves on the center land 8 and enters the pit-formation area where the two groups of pits 15 are formed. When the light beam is at a position 16 where it overlaps a pair of pits, the light beam is scattered by the pits 15, causing a reduction in the amount of reflected light from the light beam. When the light beam is at a position 17 where it does not overlap any of the pits 15, the light beam is not scattered and thus the amount of reflected light from the light beam is greater than that at the position 16. The pit information is thus reproduced by detecting a variation in the amount of reflected light from the light beam caused by the identical groups of pits 15.

Only a single representative size of the light beams 10 or 11 is shown in FIG. 15A. In reality, since a light beam has an intensity based on Gaussian distribution, the actual light range of the light beam radially expands. Accordingly, the diameter of the pits 15 may be smaller than the width of the guide grooves 7 to successfully reproduce the pit information as far as the expanded portion of the light beam overlaps the pits 15. However, the larger the overlap of the light beam 10 and the pits 15 is, the greater the variation in the amount of reflected light is, providing stable reproduction of the pit information. The diameter of the pits 15 is therefore preferably greater than the width of the guide grooves 7.

In the optical disk of FIGS. 15A and 15B, there exists a guide groove 7 or a land 8 having no pits in one track. Therefore, at least one of the three light beams 10 crosses the guide groove 7 or the land 8 having no pits even when they move across the pit-formation area. It is therefore possible to correctly count the number of guide grooves 7 crossed by the light beams 10 by using a signal obtained from the light beam which has crossed the guide groove 7 or the land 8 having no pits. This makes it possible to achieve high-speed and precise accessing.

Figure 16:
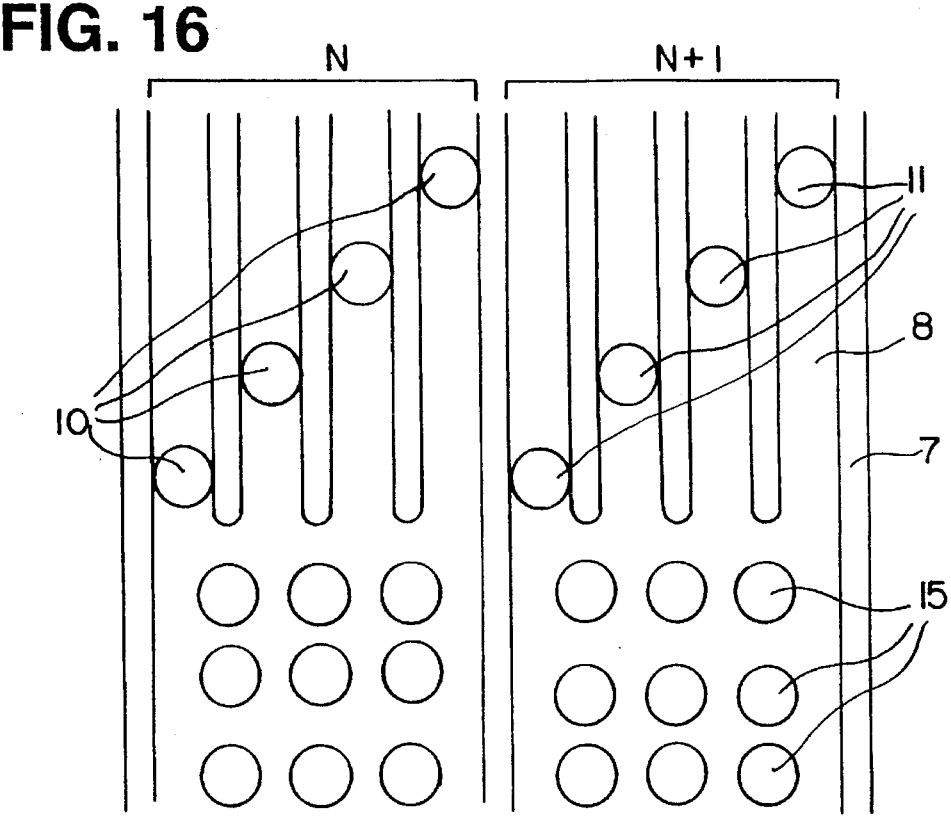
FIG. 16 is a plan view of yet another optical disk according to the present invention.

FIG. 16 shows an alternative example of the optical disk of FIGS. 15A and 15B, where four light beams are used. In this example, three identical groups of pits 15 are formed in line with three guide grooves 7 formed inside of each track. Two units of pit information are reproduced from two light beams passing the lands 8 interposed between the groups of pits 15. As a result, read errors of pit information can be reduced. Moreover, since there exists a guide groove 7 or a land 8 having no pits in one track, at least one of the four light beams 10 crosses the guide groove 7 or the land 8 having no pits even when they move across the pit-formation area. It is therefore possible to correctly count the number of guide grooves 7 crossed by the light beams 10 by using a signal obtained from the light beam which has crossed the guide groove 7 or the land 8 having no pits. This makes it possible to achieve high-speed and precise accessing.

Figure 17:
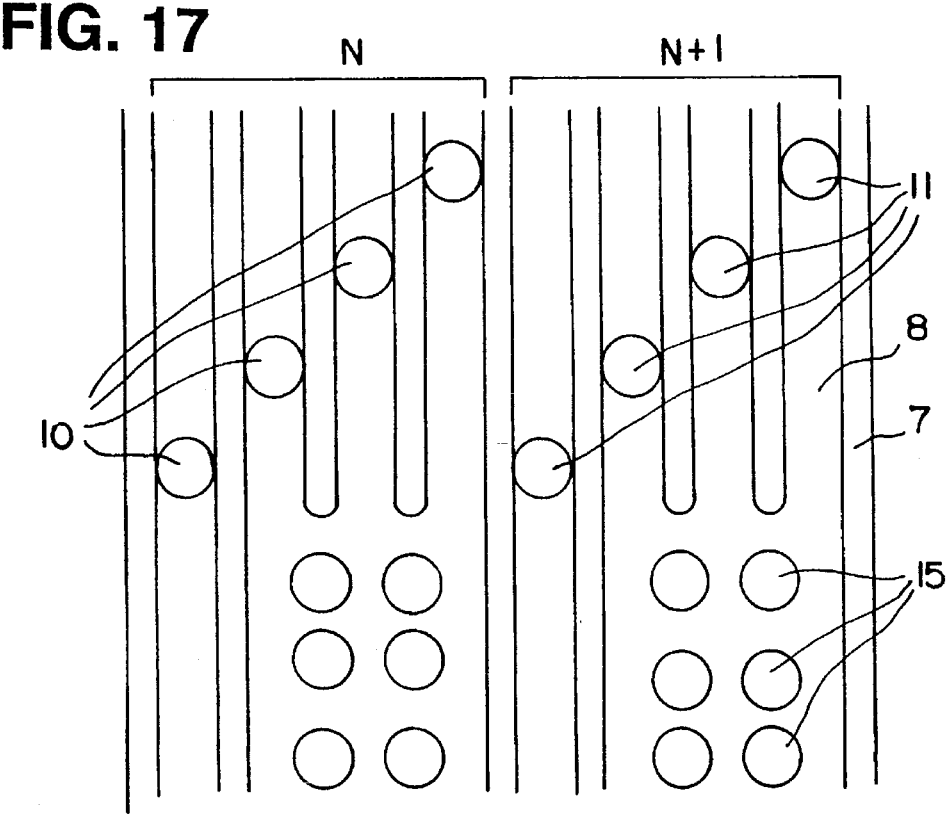
FIG. 17 is a plan view of yet another optical disk according to the present invention.

FIG. 17 shows an alternative example of the optical disk of FIG. 16 according to the present invention where four light beams are used. In this example, two identical groups of pits 15 are formed in line with two guide grooves 7 formed inside of the track. In this example, since there exists a guide groove 7 or a land 8 having no pits in one track, at least two of the four light beams 10 cross the guide groove 7 or the land 8 having no pits even when they move across the pit-formation area. It is therefore possible to correctly count the number of guide grooves 7 crossed by the light beams 10 by using a signal obtained from the light beam which has crossed the guide groove 7 or the land 8 having no pits. This makes it possible to achieve higher-speed and more precise accessing than when only one light beam is used.

A magneto-optical disk according to the example of FIGS. 14A and 14B was manufactured in the following manner. Three spiral guide grooves 7 having a width of 0.4 µm and a depth of 60 nm were formed on a glass disk substrate at a pitch of 1.0 µm. A group of pits 9 having a diameter of 0.4 µm and a depth of 60 nm were formed on every third land 8. The thus-manufactured magneto-optical disk was set in a magneto-optical disk unit capable of conducting the recording, reproduction, and deletion of information using three light beams, and the reproduction of pit information was tested. As a result, a satisfactory pit information signal was obtained. Also, the detection of a variation in the amount of reflected light from the three light beams when they cross the guide grooves 7 was ensured by using the total of the amounts of reflected light from the three light beams. As a result, the number of lands crossed by the light beams was correctly counted.

Similar results were obtained when the depth of the pits 9 was changed to 120 nm. The above-described general rule that the optimal depths of guide grooves and pits of an optical disk are $\lambda/(8n)$ and $\lambda/(4n)$, respectively, is also applied in this case.

A magneto-optical disk according to the example of FIGS. 15A and 15B was manufactured in the following manner. Three spiral guide grooves 7 having a width of 0.4 µm and a depth of 60 nm were formed on a glass disk substrate at a pitch of 1.0 µm. A group of pits 15 having a diameter of 0.4 µm and a depth of 60 nm were formed in line with two guide grooves 7. The thus-manufactured magneto-optical disk was set in a magneto-optical disk unit capable of conducting the recording, reproduction, and deletion of information using three light beams, and the reproduction of pit information was tested. As a result, a satisfactory pit information signal was obtained. Also, the detection of a variation in the amount of reflected light from the light beams when they cross the guide grooves 7 was ensured by using the total of the amounts of reflected light from the light beams. As a result, the number of lands crossed by the light beams was correctly counted.

A pit information signal with higher output was obtained when the diameter of the pits 15 was changed to 0.7 µm from 0.4 µm. The diameter of the pits is preferably in the range of 0.4 to 1.0 µm when the diameter of the light beams is 0.9 µm and the width of the guide grooves is 0.4 µm.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A method for recording, reproducing, and deleting information on and from an optical disk including a plurality of tracks each having M guide grooves (M is an integer equal to or larger than 2) and M-1 land(s) interposed between the adjacent guide grooves, at least one of the land(s) having a group of pits for producing address information, at least one of the land(s) having no pits, the method comprising the step of:

focusing light beams on the respective guide grooves and land(s) for effecting the recording, reproduction, and deletion of information.

2. A method according to claim 1, wherein the guide grooves and the lands have substantially the same width.

3. An optical disk comprising a plurality of tracks each including M guide grooves (M is an integer equal to or larger than 2) and M-1 land(s) interposed between the adjacent guide grooves, at least one of the land(s) having a group of pits for producing address information, wherein at least one land having no pits is interposed among the lands having the group of pits.

4. An optical disk according to claim 3, wherein the guide grooves and the lands have substantially the same width.

5. An optical disk according to claim 3, wherein the land having no pits which is located between the adjacent tracks has a width smaller than the lands having the group of pits which is located in the tracks.

6. An optical disk according to claim 3, wherein an area of the lands having the group of pits where the group of pits are formed has a width greater than the other area of the lands where the group of pits are not formed.

7. An optical disk according to claim 5, wherein an area of the lands having the group of pits where the group of pits are formed has a width greater than the other area of the lands where the group of pits are not formed.

8. An optical disk comprising a plurality of tracks each including M guide grooves (M is an integer equal to or larger than 2) and M-1 land(s) interposed between the adjacent guide grooves, wherein a group of pits for producing address information are formed in line with at least one of the guide grooves which is located in each of the tracks; and wherein at least one of the guide grooves is continuous.

9. An optical disk according to claim 8, wherein the guide grooves and the lands have substantially the same width.

10. An optical disk according to claim 9, wherein each of the tracks includes three guide grooves and two lands interposed between the adjacent guide grooves, and the group of pits for producing address information are formed in line with one of the three guide grooves which is located in the center.

11. An optical disk according to claim 8, wherein a land which is located between the adjacent tracks has a width smaller than the land which is located in each of the tracks.

12. An optical disk according to claim 9, wherein the diameter of the pits is smaller than the width of the guide grooves.

13. An optical disk comprising a plurality of tracks each including M guide grooves (M is an integer equal to or larger than 2) and M-1 land(s) interposed between the adjacent guide grooves, wherein a group of pits for producing address information are formed on at least one of the land(s); and wherein at least one of the land(s) has no pits.

14. An optical disk according to claim 13, wherein a group of pits for producing address information are formed in line with at least one pair of the guide grooves which are located in each of the tracks.

15. An optical disk according to claim 14, wherein the diameter of the pits is smaller than the width of the guide grooves.

16. An optical disk comprising a plurality of tracks each including M guide grooves (M is an integer equal to or larger than 2) and M-1 land(s) interposed between the adjacent guide grooves, wherein a group of pits for producing address information are formed on at least one of the land(s), and wherein each track of the plurality has no more than M-1 lands.

17. An optical disk according to claim 16, wherein the tracks are separated by lands.

* * * * *